US008855069B2

(12) United States Patent
Löhr et al.

(10) Patent No.: US 8,855,069 B2
(45) Date of Patent: Oct. 7, 2014

(54) HARQ OPERATION FOR MACRO-DIVERSITY TRANSMISSIONS IN THE DOWNLINK

(75) Inventors: Joachim Löhr, Wiesbaden (DE); Alexander Golitschek Edler Von Elbwart, Darmstadt (DE); Osvaldo Gonsa, Friedrichsdorf (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 579 days.

(21) Appl. No.: 13/146,317

(22) PCT Filed: Jan. 13, 2010

(86) PCT No.: PCT/EP2010/000139
§ 371 (c)(1),
(2), (4) Date: Aug. 31, 2011

(87) PCT Pub. No.: WO2010/086086
PCT Pub. Date: Aug. 5, 2010

(65) Prior Publication Data
US 2011/0305213 A1     Dec. 15, 2011

(30) Foreign Application Priority Data
Jan. 30, 2009   (EP) ..................................... 09001348

(51) Int. Cl.
*H04W 4/00*     (2009.01)
*H04L 1/18*      (2006.01)
*H04L 1/00*      (2006.01)

(52) U.S. Cl.
CPC ............. *H04L 1/1887* (2013.01); *H04L 1/1822* (2013.01); *H04L 2001/0092* (2013.01); *H04L 1/1845* (2013.01); *H04L 1/1812* (2013.01); *H04L 2001/0097* (2013.01)
USPC ......................................... 370/329; 370/328

(58) Field of Classification Search
CPC ... H04L 1/1887; H04L 1/1812; H04L 1/1822; H04L 2001/0097; H04L 1/0092; H04L 1/1845
See application file for complete search history.

(56) References Cited

U.S. PATENT DOCUMENTS

2005/0250500 A1*   11/2005   Xu ................................ 455/442
(Continued)

FOREIGN PATENT DOCUMENTS

| EP | 1 507 421 A1 | 2/2005 |
|---|---|---|
| WO | 2005/112328 A2 | 11/2005 |
| WO | 2008/108708 A1 | 9/2008 |

OTHER PUBLICATIONS

NTT Docomo et al; "Coding Scheme of L1/L2 Control Channel for E-UTRA Downlink", Internet Citation Jun. 27, 2006, XP002436686, Retrieved for the Internet: URL: :http://www.3gpp.org/ftp/tsg_ran/WG1_RL1/TSGR1_AH_June-06/Docs/> pp. 1-19.

(Continued)

*Primary Examiner* — Jae Y Lee
(74) *Attorney, Agent, or Firm* — Pearne & Gordon LLP

(57) ABSTRACT

The invention relates to a downlink transmission scheme that supports downlink HARQ operation and macro-diversity that is capable of overcoming the problem of HARQ protocol de-synchronization when using HARQ in the downlink with multiple data transmitting network nodes. In this scheme, a distributed HARQ protocol operation for downlink data transmissions involving multiple network nodes is provided, where only one network node is terminating downlink HARQ protocol operation towards to mobile terminal, i.e. retransmissions of a data packet are sent from a single network node, a single HARQ transmitter, to the mobile terminal. The multiple network nodes send a first transmission of the data packet to the mobile terminal in a single transmission time interval using HARQ. One of the multiple network nodes is designated as the HARQ terminating node that controls/handles all retransmissions of the data packet.

20 Claims, 9 Drawing Sheets

(56) References Cited

U.S. PATENT DOCUMENTS

| | | | |
|---|---|---|---|
| 2007/0189282 A1* | 8/2007 | Lohr et al. | 370/370 |
| 2008/0182581 A1* | 7/2008 | Ishikawa | 455/442 |
| 2008/0212506 A1* | 9/2008 | Lee et al. | 370/310 |
| 2008/0215948 A1* | 9/2008 | Pinheiro et al. | 714/748 |

OTHER PUBLICATIONS

International Search Report for PCT/EP2010/000139 dated Apr. 27, 2010.

* cited by examiner

HARQ OPERATION FOR MACRO-DIVERSITY TRANSMISSIONS IN THE DOWNLINK

FIELD OF THE INVENTION

The invention relates to a downlink that supports downlink HARQ operation and macro-diversity that is capable of overcoming the problem of HARQ protocol de-synchronization when using HARQ in the downlink with multiple data transmitting network nodes. The invention provides methods, a mobile communication system, a network node and a mobile terminal that implement the downlink transmission scheme. Furthermore, the invention is also related to the implementation of the downlink transmission scheme in software and hardware.

TECHNICAL BACKGROUND

Long Term Evolution (LTE)

Third-generation mobile systems (3G) based on WCDMA radio-access technology, such as UMTS (Universal Mobile Communications System), are currently deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on LTE called Evolved UMTS Terrestrial Radio Access (UTRA) and UMTS Terrestrial Radio Access Network (UTRAN) is to be finalized as Release 8 (Rel-8 LTE). The LTE system represents efficient packet-based radio access and radio access networks that provide full IP-based functionalities with low latency and low cost. The detailed system requirements are given in 3GPP TR 25.913, "Requirements for Evolved UTRA (E-UTRA) and Evolved UTRAN (E-UTRAN)," version 8.0.0, January 2009 (available at http://www.3gpp.org and incorporated herein by reference).

In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

E-UTRAN Architecture

The overall LTE architecture is exemplarily shown in FIG. 1 and a more detailed representation of the E-UTRAN architecture is given in FIG. 2. The E-UTRAN consists of eNBs (sometimes also referred to as eNodeBs), providing the E-UTRA user plane (PDCP/RLC/MAC/PHY) and control plane (RRC) protocol terminations towards the User Equipment (UE). The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane.

The eNB performs many functions including radio resource management, admission control, scheduling, enforcement of negotiated uplink (UL) Quality-of-Service (QoS), cell information broadcast, ciphering/deciphering of user and control plane data, and compression/decompression of downlink/uplink user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways (Serving GWs) and eNBs.

The Serving GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway (PDN GW)). For idle state UEs, the Serving GW terminates the downlink (DL) data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the Serving GW for a UE at the initial attach and at time of intra-LTE handover involving Core Network (CN) node relocation. The MME is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

OFDM with Frequency-Domain Adaptation

The AML-OFDM-based downlink used in LTE has a frequency structure based on a large number of individual subcarriers with a spacing of 15 kHz. This frequency granularity facilitates to implement dual-mode UTRA/E-UTRA terminals. The ability to reach high bit rates is highly dependent on short delays in the system and a prerequisite for this is short sub-frame duration. Consequently, the LTE sub-frame duration is set as short as 1 ms in order to minimize the radio-interface latency.

In order to handle different delay spreads and corresponding cell sizes with a modest overhead the OFDM cyclic prefix length can assume two different values. The shorter 4.7 ms cyclic prefix is enough to handle the delay spread for most unicast scenarios. With the longer cyclic prefix of 16.7 ms very large cells, up to and exceeding 120 km cell radius, with large amounts of time dispersion can be handled. In this case the length is extended by reducing the number of OFDM symbols in a sub-frame.

The basic principle of Orthogonal Frequency Division Multiplexing (OFDM) is to split the frequency band into a number of narrowband channels. Therefore, OFDM allows transmitting data on relatively flat parallel channels (subcarriers) even if the channel of the whole frequency band is frequency selective due to a multipath environment. Since the subcarriers experience different channel states, the capacities of the subcarriers vary and permit a transmission on each subcarrier with a distinct data-rate. Hence, subcarrier-wise (frequency domain) Link Adaptation (LA) by means of Adaptive Modulation and Coding (AMC) increases the radio efficiency by transmitting different data-rates over the subcarriers.

OFDM Access (OFDMA) allows multiple users to transmit simultaneously on the different subcarriers per OFDM symbol. Since the probability that all users experience a deep fade in a particular subcarrier is very low, it can be assured that subcarriers are assigned to the users who see good channel gains on the corresponding sub-carriers. When allocating resources in the downlink to different users in a cell, the scheduler takes information on the channel status experienced by the users for the subcarriers into account. The control information signaled by the users, i.e. Channel Quality Index (CQI), allows the scheduler to exploit the multi-user diversity, thereby increasing the spectral efficiency.

Hybrid ARQ Schemes

A common technique for error detection and correction in packet transmission systems over unreliable channels is called Hybrid Automatic Repeat reQuest (HARQ). Hybrid ARQ is a combination of Forward Error Correction (FEC) and the retransmission mechanism Automatic Repeat reQuest (ARQ).

If a FEC encoded packet is transmitted and the receiver fails to decode the packet correctly (errors are usually checked by a CRC (Cyclic Redundancy Check)), the receiver requests a retransmission of the packet. Generally, the transmission of additional information is called "retransmission (of a data packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed of, and depending on how the receiver processes the information, the following hybrid ARQ schemes are defined:

HARQ Type I

If the receiver fails to decode a data packet correctly, the information of the encoded data packet is discarded and a retransmission is requested. This implies that all transmissions of the data packet are decoded separately. Generally, retransmissions contain identical information (code-bits/symbols) to the initial transmission of the data packet.

HARQ Type II

If the receiver fails to decode a data packet correctly, a retransmission of the data packet is requested, where the receiver stores the information of the (erroneous received) encoded data packet as soft information (soft-bits/symbols). This implies that a soft-buffer is required at the receiver. Retransmissions can be composed out of identical, partly identical or non-identical information (code-bits/symbols) according to the same data packet as earlier transmissions.

When receiving a retransmission the receiver combines the stored information from the soft-buffer and the currently received information and tries to decode the data packet based on the combined information. The receiver can also try to decode the transmission individually, however generally performance increases when combining transmissions. The combining of transmissions is also referred to as soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with receive retransmissions. This increase comes at the cost of a required hybrid ARQ soft-buffer at the receiver. This scheme can be used to perform dynamic link adaptation by controlling the amount of information to be retransmitted. E.g. if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

HARQ Type III

This is a subset of Type II with the restriction that each transmission must be self-decodable.

HARQ Protocol Operation for Unicast Data Transmissions in LTE

In LTE there are two levels of re-transmissions for providing reliability, namely, HARQ at the MAC layer and outer ARQ at the RLC layer. The outer ARQ is required to handle residual errors that are not corrected by HARQ that is kept simple by the use of a single bit error-feedback mechanism, i.e. ACK/NACK.

An N-process stop-and-wait HARQ is employed that has asynchronous re-transmissions in the downlink and synchronous re-transmissions in the uplink. Synchronous HARQ means that the re-transmissions of HARQ blocks occur at predefined periodic intervals. Hence, no explicit signaling is required to indicate to the receiver the retransmission schedule. Asynchronous HARQ offers the flexibility of scheduling re-transmissions based on air interface conditions. In this case some identification of the HARQ process needs to be signaled in order to allow for a correct combing and protocol operation.

In 3GPP, HARQ operation with eight processes is decided for LTE. The HARQ protocol operation for downlink data transmission is similar or even identical to HSDPA. In uplink HARQ protocol operation there are two different options on how to schedule a retransmission. Retransmissions are either scheduled by a NACK (=synchronous non-adaptive retransmission) or explicitly scheduled by a Physical Downlink Control CHannel (PDCCH) (=synchronous adaptive retransmissions).

In case of a synchronous non-adaptive retransmission the retransmission will use the same parameters as the previous uplink transmission, i.e. the retransmission will be signaled on the same physical channel resources respectively uses the same modulation scheme. Since synchronous adaptive retransmission are explicitly scheduled via PDCCH, the eNB has the possibility to change certain parameters for the retransmission. A retransmission could be for example scheduled on a different frequency resource in order to avoid fragmentation in the uplink, or the eNB could change the modulation scheme or alternatively indicate to the UE what redundancy version to use for the retransmission. It should be noted that the HARQ feedback (ACK/NACK) and PDCCH signaling occurs at the same timing. Therefore the UE only needs to check once whether a synchronous non-adaptive retransmission is triggered, only NACK is received, or whether eNB requests a synchronous adaptive retransmission, i.e. a PDCCH is signaled in addition to the HARQ feedback.

L1/2 Control Signaling in LTE

In order to inform the scheduled users about their allocation status, transport format and other data related information (e.g. HARQ), L1/L2 control signaling is transmitted on the downlink along with the data. The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length is a multiple of the sub-frames. The TTI length may be fixed in a service area for all users, may be different for different users, or may even by dynamic for each user. Generally, then the L1/2 control signaling needs only be transmitted once per TTI.

The L1/L2 control signaling is transmitted on the Physical Downlink Control Channel (PDCCH). It should be noted that assignments for uplink data transmissions, uplink grants, are also transmitted on the PDCCH.

Generally, the information sent on the L1/L2 control signaling may be separated into the Shared Control Information (SCI) and Dedicated Control Information (DCI).

Shared Control Information (SCI)

Shared Control Information (SCI) carries so-called Cat 1 information. The SCI part of the L1/L2 control signaling contains information related to the resource allocation (indication). The SCI typically contains the following information:

User identity, indicating the user which is allocated
RB allocation information, indicating the resources (Resource Blocks, RBs) on which a user is allocated. Note, that the number of RBs on which a user is allocated can be dynamic.
Duration of assignment (optional) if an assignment over multiple sub-frames (or TTIs) is possible
Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI)

Dedicated Control Information (DCI) carries the so-called Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:

Cat 2: Modulation scheme, transport-block (payload) size (or coding rate), MIMO related information, etc. Note, either the transport-block (or payload size) or the code rate can be signaled. In any case these parameters can be calculated from each other by using the modulation scheme information and the resource information (number of allocated RBs).
Cat 3: HARQ related information, e.g. hybrid ARQ process number, redundancy version, retransmission sequence number L1/L2 Control Signaling Information for Downlink Data Transmission Along with the downlink packet data transmission, L1/L2 control signaling is transmitted on a separate physical channel (PDCCH). This L1/L2 control signaling typically contains information on:

The physical channel resource(s) on which the data is transmitted (e.g. subcarriers or subcarrier blocks in case of OFDM, codes in case of CDMA). This information allows the UE (receiver) to identify the resources on which the data is transmitted.

The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the UE (receiver) to identify the information bit size, the modulation scheme and the code rate in order to start the demodulation, the de-rate-matching and the decoding process. In some cases the modulation scheme maybe signaled explicitly.

HARQ information:
  Process number: Allows the UE to identify the HARQ process on which the data is mapped.
  Sequence number or new data indicator: Allows the UE to identify if the transmission is a new packet or a retransmitted packet.
  Redundancy and/or constellation version: Tells the UE, which hybrid ARQ redundancy version is used (required for de-rate-matching) and/or which modulation constellation version is used (required for demodulation)

UE Identity (UE ID): Tells for which UE the L1/L2 control signaling is intended for. In typical implementations this information is used to mask the CRC of the L1/L2 control signaling in order to prevent other UEs to read this information.

L1/L2 Control Signaling Information for Uplink Data Transmission

To enable an uplink packet data transmission, L1/L2 control signaling is transmitted on the downlink (PDCCH) to tell the UE about the transmission details. This L1/L2 control signaling typically contains information on:

The physical channel resource(s) on which the UE should transmit the data (e.g. subcarriers or subcarrier blocks in case of OFDM, codes in case of CDMA).

The transport Format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the UE (transmitter) to pick the information bit size, the modulation scheme and the code rate in order to start the modulation, the rate-matching and the encoding process. In some cases the modulation scheme maybe signaled explicitly.

Hybrid ARQ information:
Process number: Tells the UE from which hybrid ARQ process it should pick the data.
Sequence number or new data indicator: Tells the UE to transmit a new packet or to retransmit a packet.
Redundancy and/or constellation version: Tells the UE, which hybrid ARQ redundancy version to use (required for rate-matching) and/or which modulation constellation version to use (required for modulation).
UE Identity (UE ID): Tells which UE should transmit data. In typical implementations this information is used to mask the CRC of the L1/L2 control signaling in order to prevent other UEs to read this information.

There are several different flavors how to exactly transmit the information pieces mentioned above. Moreover, the L1/L2 control information may also contain additional information or may omit some of the information. E.g.:

HARQ process number may not be needed in case of a synchronous HARQ protocol.
A redundancy and/or constellation version may not be needed if Chase Combining is used (always the same redundancy and/or constellation version) or if the sequence of redundancy and/or constellation versions is pre defined.
Power control information may be additionally included in the control signaling.
MIMO related control information, such as e.g. pre-coding, may be additionally included in the control signaling.
In case of multi-codeword MIMO transmission transport format and/or HARQ information for multiple code words may be included.

For uplink resource assignments (for transmissions on the Physical Uplink Shared CHannel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively modulation and coding scheme (MCS) field has for example a size of bits, which corresponds to 32 entries. 3 TF/MCS table entries are reserved for indicating RVs 1, 2 or 3. The remaining MCS table entries are used to signal the MCS level (TBS) implicitly indicating RV0. For details on the TBS/RV signaling for uplink assignments on PDCCH please see 3GPP TS 36.213, "Evolved Universal Terrestrial Radio Access (E-UTRA); Physical layer procedures", version 8.5.0, December 2008 (available at http://www.3gpp.org and incorporated herein by reference). The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Further Advancements for LTE (LTE-A)

The frequency spectrum for IMT-Advanced was decided at the World Radiocommunication Conference 2007 (WRC-07) last November [Final Acts WRC-07, Geneva, November 2007]. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved 3GPP TR 36.814 (available at http://www.3gpp.org and incorporated herein by reference). The study item covers technology components to be considered for the evolution of E-UTRA, e.g. to fulfill the requirements on IMT-Advanced. Two major technology components which are currently under consideration for LTE-A are described in the following.

LTE-A Support of Wider Bandwidth

Carrier aggregation, where two or more component carriers are aggregated, is considered for LTE-Advanced in order to support wider transmission bandwidths e.g. up to 100 MHz and for spectrum aggregation.

A terminal may simultaneously receive or transmit one or multiple component carriers depending on its capabilities:

An LTE-Advanced terminal with reception and/or transmission capabilities for carrier aggregation can simultaneously receive and/or transmit on multiple component carriers.
An Rel-8 LTE terminal can receive and transmit on a single component carrier only, provided that the structure of the component carrier follows the Rel-8 specifications.
It shall be possible to configure all component carriers LTE Release 8 compatible, at least when the aggregated numbers of component carriers in the UL and the DL are same. Consideration of non-backward-compatible configurations of LTE-A component carriers is not precluded LTE-A Support of Relaying Functionality Relaying is considered for LTE-Advanced as a tool to improve e.g. the coverage of high data rates, group mobility, temporary network deployment, the cell-edge throughput and/or to provide coverage in new areas.

The relay node is wirelessly connected to radio-access network via a donor cell. The connection can be inband, in which case the network-to-relay link share the same band with direct network-to-UE links within the donor cell. Rel-8 UEs should be able to connect to the donor cell in this case.
outband, in which case the network-to-relay link does not operate in the same band as direct network-to-UE links within the donor cell With respect to the knowledge in the UE, relays can be classified into transparent, in which case the UE is not aware of whether or not it communicates with the network via the relay, and non-transparent, in which case the UE is aware of whether or not it is communicating with the network via the relay.

Depending on the relaying strategy, a relay may be part of the donor cell or control cells of its own.

In the case the relay is part of the donor cell, the relay does not have a cell identity of its own (but may still have a relay ID). At least part of the radio resource management (RRM) is controlled by the eNB to which the donor cell belongs, while parts of the RRM may be located in the relay. In this case, a relay should preferably support also Rel-8 LTE UEs. Smart repeaters, decode-and-forward relays and different types of Layer 2 relays are examples of this type of relaying.

In the case the relay is in control of cells of its own, the relay controls one or several cells and a unique physical-layer cell identity is provided in each of the cells controlled by the relay. The same RRM mechanisms are available and from a UE perspective there is no difference in accessing cells controlled by a relay and cells controlled by a "normal" eNodeB. The cells controlled by the relay should support also Rel-8 LTE UEs. Self-backhauling (Layer 3 relay) uses this type of relaying.

In FIG. 3 shows an exemplary LTE-A system which utilizes relay nodes (RN). The wireless interface between eNB and RN, which connects a RN with the radio access network, is referred to as Y3 interface.

It would be in general advantageous to utilize in LTE-A the presence of relay nodes in order to benefit from macro-diversity downlink transmissions. Since it is presently foreseen that relay nodes support scheduling and HARQ functionalities (data of) the same transport block could be transmitted simultaneously from multiple network nodes, i.e. eNB and RN. By combining the received energy from multiple received downlink transmissions prior to decoding, the receiver in the UE could benefit from the macro-diversity gain and hence increased decoding performance. This would be similar to the soft handover operation in UMTS. UMTS supports soft handover operation for downlink as well as for uplink in order to obtain the macro-diversity gain.

However only for the uplink direction, i.e. in Rel-6 HSUPA, HARQ is also supported for soft handover. For the downlink direction, there is no support of HARQ in soft handover. HSDPA (Rel-5/Rel-7) does not support soft handover due to problems with the HARQ protocol. Since for a downlink HARQ operation during soft handover, there will be multiple HARQ transmitting entities and single HARQ receiving entity, HARQ feedback errors on the uplink direction could lead to unsynchronized HARQ protocol states.

For example, in case UE sends an NACK in response to the reception of downlink transmissions from the two eNBs forming the UE's active set, and assuming that one of the eNBs erroneously detects an ACK due to errors on the uplink channel, the HARQ protocol states in the eNBs would be different, i.e. the eNB receiving the NACK assumes a further retransmission for the transport block, whereas the eNB erroneously detecting an ACK assumes that the transport block was correctly decoded by UE and starts transmitting a new transport block.

SUMMARY OF THE INVENTION

One object of the invention is to supporting downlink HARQ operation with macro-diversity in a mobile communication system. Furthermore, it is desirable that the proposed downlink HARQ operation further allows for reducing the delay in downlink data transmission.

The object is solved by the subject matter of the independent claims. Advantageous embodiments of the invention are subject matters of the dependent claims.

One aspect of the invention is to suggest a downlink transmission scheme that support downlink HARQ operation and macro-diversity. The invention suggests a distributed HARQ protocol operation for downlink data transmissions involving multiple network nodes, where only one network node is terminating downlink HARQ protocol operation towards to mobile terminal. I.e. retransmissions of a data packet are sent from a single network node, a single HARQ transmitter, to the mobile terminal. In more detail, the multiple network nodes send transmissions to the mobile terminal in a single transmission time interval using HARQ. One of the multiple network nodes is designated as the HARQ terminating node. Accordingly, the mobile node sends HARQ feedback only to this HARQ terminating node and all retransmission for a data packet are handled by the designated HARQ terminating node.

This aspect may not only be used for downlink transmissions supporting HARQ from a base station (such as an eNB) and a relay node, but may also be applied to soft handover scenarios where a serving base station and at least one further non-serving base station provide downlink data to a mobile terminal (such as an UE) using HARQ. Therefore, it is also referred to a first and a second network node in the following to contemplate the different options of applying the different concepts and variations of the invention outlined above and in the following.

One embodiment of the invention is related to a method for transmitting downlink data in a mobile communication system comprising a mobile terminal and at least two network nodes. The network nodes are capable of communicating with the mobile terminal via a wireless interface. The first network node (for example a (serving) base station) transmits a data packet and control information for a transmission of the data packet to the second network node (for example a relay node or a non-serving base station). The control information indicates whether the first or the second network node terminates a HARQ protocol used for transmitting the data packet to the mobile terminal. The first network node and the second network node transmit a respective transmission of a data packet to the mobile terminal within one transmission time interval and using one of plural HARQ processes of the HARQ protocol. It should be noted that the terms transmission time interval and sub-frame are interchangeable, if the transmission time interval has a duration equivalent to one sub-frame, as for example in LTE.

The network node terminating the HARQ protocol only, i.e. the first or the second network node, receives HARQ feedback on the successful or unsuccessful decoding of the data packet from the mobile terminal, and is transmitting all retransmissions of the data packet to the mobile terminal.

In a further embodiment of the invention, the first network node and/or the second network node is further transmitting a respective physical downlink control channel to the mobile terminal. A respective physical downlink control channel's information indicates the physical channel resource and the HARQ process on which the transmission of the data packet is transmitted to the mobile terminal.

In a further embodiment of the invention, the physical channel resource for transmitting the HARQ feedback is chosen by the mobile terminal depending on the number of physical downlink control channels that are received. If both, the first network node and the second network node each transmit a physical downlink control channel to the mobile (i.e. the mobile terminal receives more than one physical downlink control channel), the mobile terminal sends the HARQ feedback via a physical uplink channel resource configured by radio resource control (RRC) signaling to the network node terminating the HARQ protocol only.

If only one of the first network node and the second network node transmits a physical downlink control channel indicating the physical channel resource and the HARQ process on which the respective transmission of the data packet is transmitted, the mobile terminal sends HARQ feedback from the mobile terminal via a physical uplink channel resource linked to the physical downlink control channel resource index on which the physical downlink control channel is received by the mobile terminal.

In one embodiment of the invention, the control information transmitted from the first network node to the second network node comprises a flag indicating whether the first or the second network node terminates a HARQ protocol. In one more specific example, the control information transmitted from the first network node to the second network node may further indicate the HARQ process to be used for transmitting the data packet to mobile terminal and the value of the new data indicator for the data packet. For example, if a single frequency network (SFN) is formed by the first and the second network node, the signaling of the HARQ process is not necessary. In another example, the control information transmitted from the first network node to the second network node additionally indicates transport format information of the transmission of the data packet from the second network node to the mobile terminal.

According to another exemplary embodiment of the invention, the first network node and the second network node simultaneously transmit the transmission of the data packet within the same transmission time interval. To synchronize the transmission of the data packet, the control information transmitted from the first network node to the second network node could for example indicate transmission time interval in which the transmission of the data packet is to be sent by the second network node.

If the data packet is to be transmitted in an SFN transmission, the control information transmitted from the first network node to the second network node may further indicate the physical shared downlink channel resource and transport format information for transmitting the transmission of the data packet to the mobile terminal, so that the first network node to the second network node can simultaneously transmit the transmission of the data packet on the same physical channel resource and using the same transport format.

According to another embodiment of the invention, the first network node can decide whether the first network node or the second network node is to terminate the HARQ protocol for the transmission of the data packet. This decision could be for example mage for each data packet to be transmitted to the mobile terminal. In a further variation, this decision by the first network node is based on the downlink channel quality reported by the mobile terminal and/or based on radio resource management criteria.

The invention also relates to the implementation of the above described method in software and hardware. Accordingly, another embodiment of the invention provides a mobile communication system for transmitting downlink data. The mobile communication system comprises a mobile terminal, a first network node and a second network node, wherein the first network node and the second network node are capable of communicating with the mobile terminal via a wireless interface. The first network node is adapted to transmit a data packet and control information on whether the first network node or the second network node terminates the HARQ protocol for a transmission of the data packet to the second network node. The first network node and the second network node are adapted to transmit a respective transmission of a data packet to the mobile terminal within one transmission time interval and using one of plural HARQ processes of the HARQ protocol. As described above, only the HARQ terminating entity receives HARQ feedback on the successful or unsuccessful decoding of the data packet from the mobile terminal and transmits all retransmissions of the data packet from the network node terminating the HARQ protocol to the mobile terminal.

In a further embodiment of the invention, a mobile terminal for receiving downlink data in a mobile communication system is configured as follows. The mobile terminal comprises a receiver for receiving from a first network node and a second network node a respective transmission of a data packet within a single transmission time interval. Furthermore, the mobile terminal is equipped with a processing unit for combining the transmissions of the data packet received from the first network node and the second network node and a decoder for decoding the combined transmissions of the data packet. The mobile terminal also comprises a transmitter for transmitting HARQ feedback only to a HARQ terminating entity being either the first network node or the second network node. The mobile terminal is configured to receive all retransmissions for the data packet only from the HARQ terminating entity.

In another embodiment of the invention, the mobile terminal's receiver receives RRC signaling indicating a physical channel resource to be used for sending HARQ feedback related to the transmissions of the data packet to the network node terminating the HARQ protocol, and the transmitter of the mobile terminal is operable to transmit the HARQ feedback related to the transmission of the data packet to the network node terminating the HARQ protocol using the physical channel resource configured by the RRC signaling, if a respective physical downlink control channel for the transmissions of the data packet is received from the first network node and the second network node.

The mobile terminal according to another embodiment of the invention, more precisely its transmitter is further operable to transmit HARQ feedback for retransmissions of the data packets on a physical uplink channel resource linked to the physical downlink channel resource index of a physical downlink control channel, if only one physical downlink control channel is received for a transmission of the data packet. For example, if implementing the concepts of the invention in a LTE system (i.e. an advanced LTE system), the HARQ feedback resource may be linked to the Control Channel Element (CCE) index of the PDCCH that signaled the L1/L2 control information for the corresponding transmission of the data packet on the PDSCH.

As indicated above, the decision in the access network on which network node is to terminate the HARQ protocol towards the mobile terminal may be based on the downlink channel quality. Accordingly, in a further embodiment of the invention, the mobile terminal further comprises a measuring unit for measuring the downlink channel quality from the first network node to the mobile terminal. The mobile terminal's transmitter transmits the measured channel quality of the downlink channel to the first network node. For instance, the channel quality in the downlink may be signaled by CQI values. The measuring unit may optionally further measure the downlink channel quality from the second network node to the mobile terminal and can report this measured channel quality to the network node terminating the HARQ protocol as well.

Another embodiment of the invention is relating to a network node for use in a mobile communication system. The network node is capable of communicating with the mobile terminal via a wireless interface and comprises a transmitter for transmitting a data packet and control information for a transmission of the data packet to another network node. As outlined above, the control information indicates whether the network node or another network node terminates a HARQ protocol used for transmitting the data packet to the mobile terminal and a transmission time interval in which the network node and the other network node are to transmit a transmission of the data packet to the mobile terminal. The transmitter of the network node is adapted to transmitting a respective transmission of a data packet to the mobile terminal within said transmission interval and using one of plural HARQ processes of the HARQ protocol. The network node further comprises a receiver for receiving from the mobile terminal HARQ feedback on the successful or unsuccessful decoding of the data packet and the transmitter of the network node transmits all retransmissions of the data packet only to the mobile terminal, if the network node is terminating the HARQ protocol.

In a further embodiment of the invention the network node further comprises a processing unit for deciding whether the network node or the other network node is to terminate the HARQ protocol for the transmission of the data packet. The decision unit may for example perform a decision for each data packet to be transmitted to the mobile terminal.

In another embodiment of the invention, the transmitter of the network node is adapted to transmit a physical downlink control channel to the mobile node indicating the physical shared downlink channel resource on which the transmitter is transmitting said transmission of the data packet and transport format information. In this and in the respective previously described embodiments, the physical downlink control channel may be for example sent in the same transmission time interval or sub-frame as the transmission of the data packet. If the invention is applied—for example—to an LTE or LTE-A system, the physical downlink control channel refers to the PDCCH that is sent in parallel to the PDSCH on which the downlink data is transmitted to the mobile terminal.

As indicated above, another aspect of the invention is the implementation of the different embodiments of the invention in hardware and software (or combinations thereof). Therefore, another embodiment of the invention is related to a computer-readable medium storing instructions that, when executed by a processor unit of a mobile terminal, cause the mobile terminal to receive downlink data in a mobile communication system. The instructions cause mobile terminal to receive from a first network node and a second network node and using HARQ a respective transmission of a data packet within a single transmission time interval, and further to combine the transmissions of the data packet received from the first network node and the second network and to subsequently decode the combined transmissions of the data packet. Moreover, the instructions stored on the computer-readable medium further cause the mobile terminal to transmit HARQ feedback only to a HARQ terminating entity being either the first network node or the second network node and to receive all retransmissions for the data packet only from the HARQ terminating entity.

Another embodiment of the invention is related to a computer-readable medium storing instruction that when executed by a processing unit if a network node, cause the network node to transmit a data packet and control information for a transmission of the data packet to another network node, wherein the control information indicates whether the network node or the other network node terminates a HARQ protocol used for transmitting the data packet to the mobile terminal and a transmission time interval in which the network node and the other network node are to transmit a transmission of the data packet to the mobile terminal, and to transmit a respective transmission of a data packet to the mobile terminal within said transmission time interval and using one of plural HARQ processes of the HARQ protocol. Further, the instructions cause the network node to receive from the mobile terminal HARQ feedback on the successful or unsuccessful decoding of the data packet, if the network node is terminating the HARQ protocol and to transmit all retransmissions of the data packet only to the mobile terminal, if the network node is terminating the HARQ protocol.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
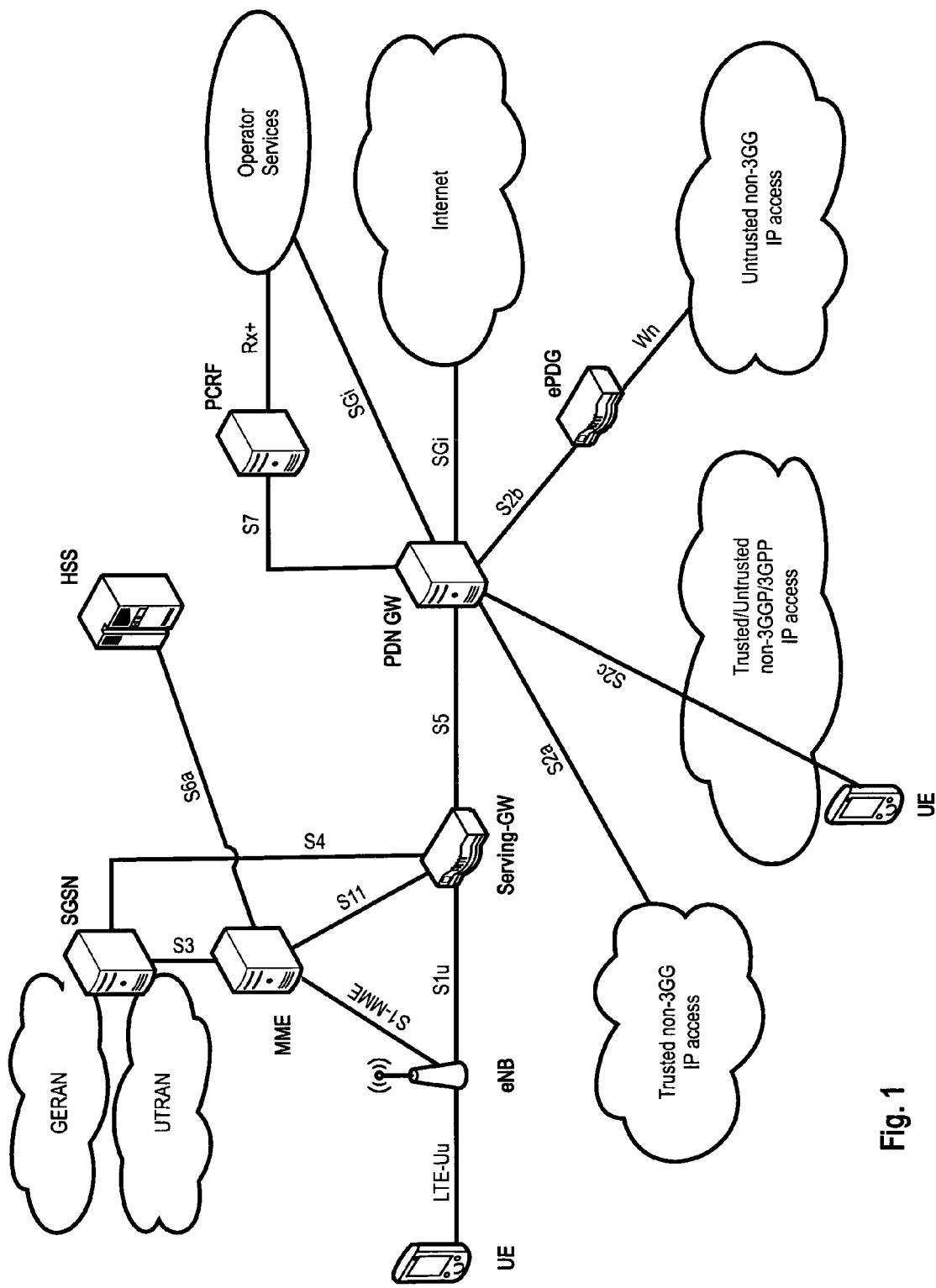
FIG. 1 shows an exemplary architecture of a 3GPP LTE system.
Figure 2:
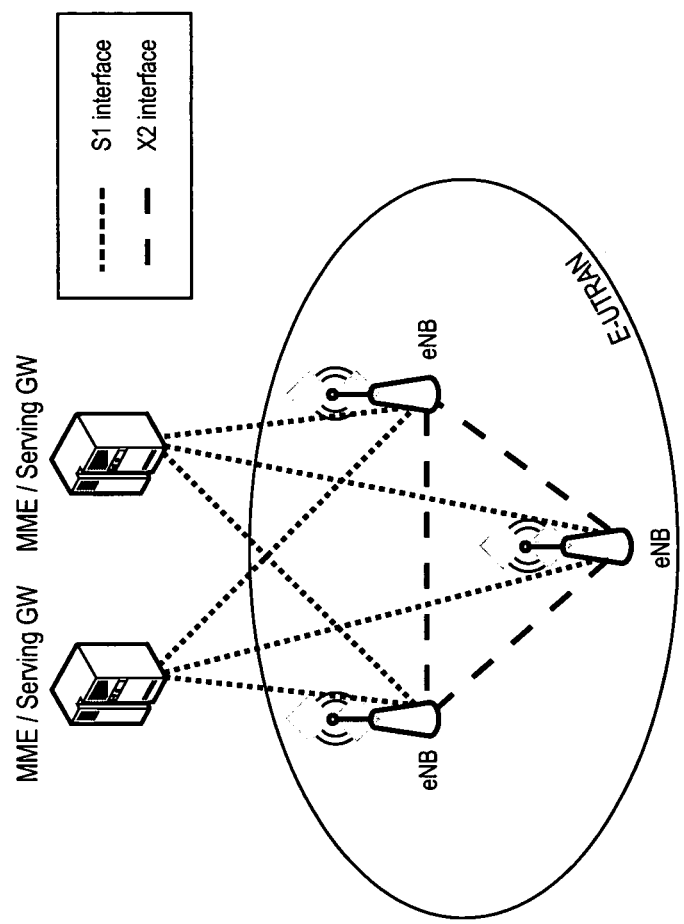
FIG. 2 shows an exemplary overview of the overall E-UTRAN architecture of LTE.

The following paragraphs will describe various embodiments of the invention. For exemplary purposes only, most of the embodiments are outlined in relation to an (evolved) communication system according to LTE and its currently developed enhancements discussed in the Technical Background section above.

One aspect of the invention is to suggest a downlink transmission scheme that supports downlink HARQ operation and macro-diversity, as already indicated above. The problem of HARQ protocol de-synchronization in case using downlink macro-diversity transmissions, i.e. multiple transmitters and a single receiver also exists in LTE-A, e.g. when an eNB and a RN transmit downlink data or during soft handover.

In order to avoid the HARQ protocol de-synchronization in LTE-A between eNB and RN, it is for example possible to introduce a new signaling exchange between the eNB and RN over their linking interface (referred to as the Y3 interface) in order to keep the HARQ protocol states of eNB and RN in-sync. For example the HARQ feedback would need to be synchronized between the involved network nodes. One network node decides the "final" HARQ feedback for a downlink transmission, e.g. RN sends received HARQ feedback to eNB, eNB decides "final" HARQ feedback and informs RN. Similarly, also the downlink (re)transmissions are coordinated among the network nodes. For initial downlink transmissions, for example the transport block and corresponding control information, e.g. transmission timing, HARQ info, is signaled between eNB and RN. In case of retransmissions at least the information on the transmission timing needs to be transferred over the Y3 interface so that the retransmissions are transmitted simultaneously from both network entities.

Though this solution overcomes the problem of HARQ protocol de-synchronization, this solutions appear not optimal as there are several drawbacks inherent to this synchronization procedure between the involved network nodes. First of all there will be an increased delay for downlink retransmissions, since prior to any retransmission the HARQ feedback needs to be synchronized between eNB and RN. Basically the synchronization step takes two hops of the Y3 interface, i.e. forwarding of received HARQ feedback to the network node which determines the "final HARQ feedback" and then sending back the information of "final HARQ feedback" to the network node. Since the Y3 interface is a wireless interface the scheduling delay needs to be also taken into account. Furthermore the synchronization step increases the signaling overhead over the Y3 interface. It should be noted that transmissions over the Y3 interface might be also subject to HARQ retransmissions which further increases the delay as well as the signaling overhead. Finally the determination of a "final HARQ feedback" in one network node requires some extra complexity.

Accordingly, another downlink transmission scheme is proposed herein that is overcoming the problem of HARQ protocol de-synchronization that has not that many drawbacks inherent to its design. According to this more advanced scheme according to a first aspect of the invention, a distributed HARQ protocol operation for downlink data transmissions involving multiple network nodes is provided, where only one network node is terminating downlink HARQ protocol operation towards to mobile terminal, i.e. retransmissions of a data packet are sent from a single network node, a single HARQ transmitter, to the mobile terminal.

In more detail, multiple network nodes send a "first" transmission of the data packet, e.g. a transport block or MAC PDU, to the mobile terminal in a single transmission time interval using one of the HARQ processes. One of the multiple network nodes is designated as the HARQ terminating node. Accordingly, the mobile node sends HARQ feedback only to this HARQ terminating node and all potential further retransmissions for a data packet are handled by the designated HARQ terminating node.

One network node (the serving network node) may decide which of the network nodes involved in the macro-diversity transmission to the mobile terminal is to terminate the HARQ protocol, i.e. is to control the retransmissions for the data packet (if any). In one exemplary embodiment of the invention, the eNB to which the donor cell belongs acts as the serving network node. This decision may be for example semi-static or dynamic, i.e. the serving network node could decide for each data packet to be sent to the mobile terminal which of the network nodes transmitting the first transmission of the data packet should terminate the HARQ protocol and handles the retransmissions. The decision on the HARQ termination node may for example be based on the downlink channel quality reported by the mobile terminal and/or may further take into account radio resource management considerations, such as load or capacity in the network nodes.

The proposed scheme may not only be used for downlink transmissions supporting HARQ from a base station (such as an eNB) and a relay node, but may also be applied to other scenarios where a serving base station and at least one further non-serving base station or other network entities provide downlink data to a mobile terminal (such as an UE) using HARQ. The scheme may also be applied to LTE or LTE-A and inter alia supports macro-diversity downlink transmission to a UE from an eNB and a RN.

Generally, it should be further noted that only the first transmission for a data packet are sent by multiple network nodes, while subsequent retransmissions for the data packet in another transmission time interval are only provided by the network node that is terminating the HARQ protocol. For this first transmission of the data packet by the multiple network nodes (at least two), there are different options for transmitting the data packet. The network nodes may for example transmit:

1. same channel coded bits of the data packet to the mobile node (for example, the multiple network nodes may transmit the same redundancy version of the data packet within the transmission time interval on different or same physical channel resources on the downlink), or
2. different channel coded bits (for example, one of multiple network nodes may transmit a first redundancy version of the data packet and the other network nodes transmit another redundancy version within the transmission time interval on different physical channel resources; or all network nodes transmit different redundancy versions of the data packet within the transmission time interval on different physical channel resources).

The first (or initial) transmission of the transport block means that a new transport block is being sent, which implies that the receiver, i.e. the mobile terminal, should not combine the transmission of the new transport block with any buffered data previously received on the respective HARQ process. For example, the indication of a new transport block being sent is signaled by means of the NDI, which is toggled for each transport block. Alternatively, also a sequence number that is incremented or decremented for every new transport block could be used.

A transport block may for example comprise systematic bits. The first transmission of a transport block may typically include the systematic bits of the transport block, so that the receiver has the possibility to decode the received transmission. However, this is not mandatory. There may be schedulers that send only parity bits in a first transmission of the transport block and that send the systematic bits with one of the retransmissions.

Moreover, it should also be noted that the network nodes may also form a so-called single frequency network (SFN) for the "first" transmission. If using option 1 above for the "first" transmission, the network nodes all send the same data at the same timing, same physical downlink channel resource and using the same transport format/modulation and coding scheme. Hence, the physical downlink channel transmissions of the same data by the different network nodes are "combined" on the physical downlink channel, so that the mobile terminal does not recognize the different transmissions, but receives only "one" transmission of the data packet. In case the mobile terminal needs to be informed on the timing, the physical downlink channel resource and/or the transport format/modulation and coding scheme, it is sufficient to send only one physical control channel comprising the required control information, as the timing, the physical downlink channel resource and the transport format/modulation and coding scheme is identical for all transmissions. Furthermore, the network node coordinating the downlink data transmission to the mobile terminal (the serving network node) may inform the other network nodes on timing, physical downlink channel resource and transport format/modulation and coding scheme.

In the following several embodiments of the invention will be described exemplarily focusing on the LTE architecture and its enhancements (LTE-A) as discussed in the Technical Background section. As already mentioned above, the invention allows for downlink HARQ operation with macro-diversity by using a distributed HARQ protocol operation for downlink data transmissions among multiple network nodes, however where only one network node is terminating the HARQ protocol operation towards to the UE. One of the design aspects of the proposed downlink data transmission scheme according to one embodiment of the invention is that the network node, which is terminating the HARQ protocol operation (which will be also referred to as "HARQ terminating network node" herein), can be dynamically selected per transport block (data packet). Since there is only one network node terminating HARQ protocol, from protocol point of view there is basically a single HARQ transmitter/single HARQ receiver relation similar to the non-soft handover operation.

A further exemplary characteristic of the distributed HARQ protocol outlined in the following is that the UE is only sending HARQ feedback to the one network node, i.e. to the HARQ terminating network node. In order to gain from the macro-diversity initial downlink transmissions of a transport block are sent simultaneously from multiple network nodes, for example from a relay node and a base station (eNB). However, retransmissions for a transport block (data packet) are only transmitted from a single network node, presumably the network node which is terminating the HARQ protocol towards to the UE.

One advantage of this kind of downlink HARQ operation is that the UE can benefit from the macro-diversity for the first downlink transmission of the data packet. Since retransmissions are sent without using macro-diversity from a single network node (the HARQ terminating network node), there is no need to synchronize the HARQ feedback sent from UE among the network nodes, which would imply all the drawbacks as already mentioned before.

Figure 3:
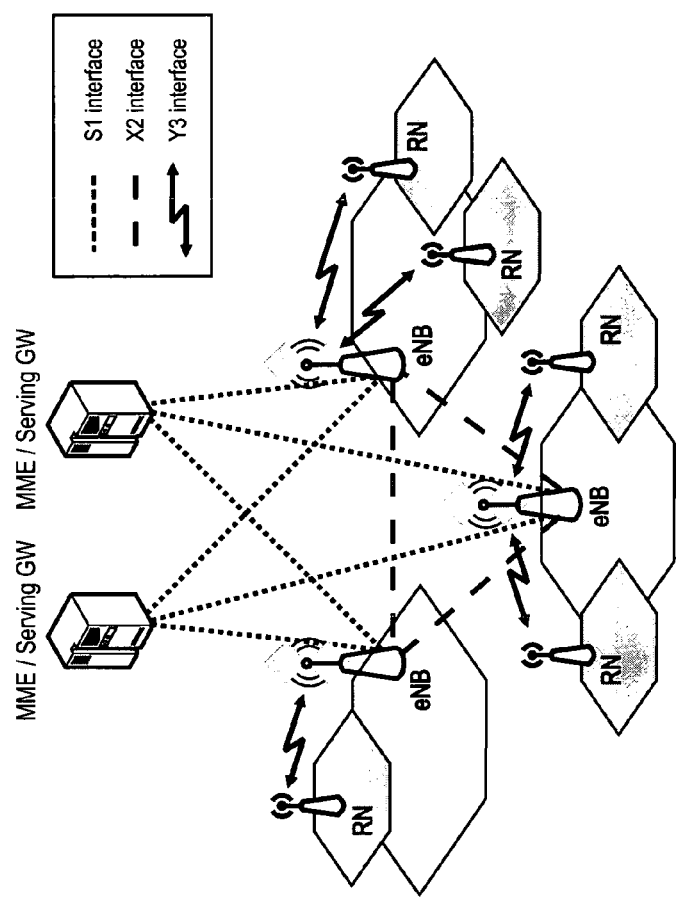
FIG. 3 shows an exemplary overview of the overall E-UTRAN architecture of LTE-A including several relay nodes (RN)
Figure 4:
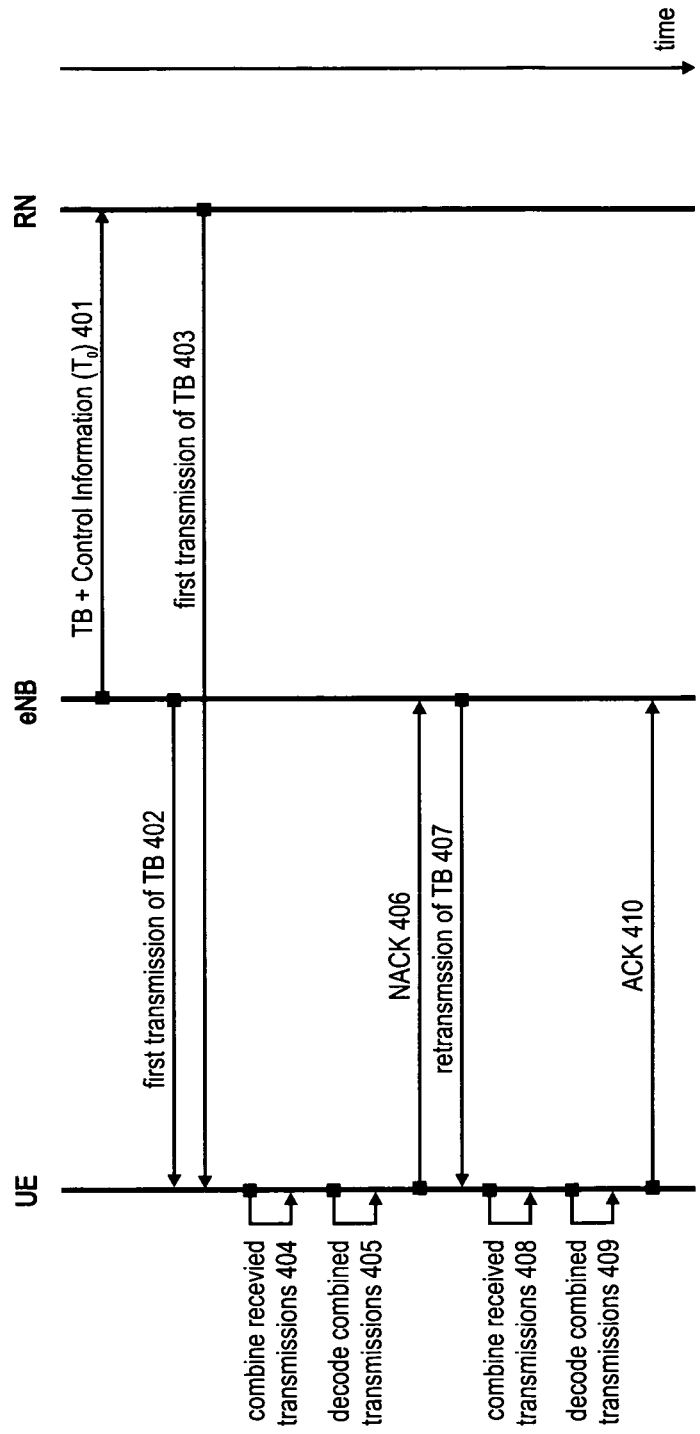
FIGS. 4 & 5 shows a message flow and operation of a UE, an eNB and a RN when using a downlink data transmission scheme employing macro-diversity and HARQ according to different exemplary embodiments of the invention.

An exemplary scenario for the distributed HARQ protocol operation is shown in FIG. 4. In the exemplary embodiment of the invention depicted in FIG. 4, the eNB is the network node terminating the HARQ protocol towards the UE. Prior to any downlink transmission of a transport block, the eNB conveys 401 the transport block (TB) and some associated control information to the relay node via the air interface linking the nodes (i.e. the Y3 interface in the 3GPP LTE-A architecture shown in FIG. 3). The control information contains inter alia information on the transmission timing (e.g. an indication of the sub-frame or transmission time interval) of the first transmission of the transport block.

The first transmission of the forwarded transport block on the downlink is sent 402, 403 from both eNB and relay node at the synchronized transmission timing conveyed within the control information. The UE combines 404 the received transmissions and tries to decode 405 the transport block. Depending on the decoding result the UE sends HARQ feedback in form of either ACK or NACK in the uplink.

Since the eNB is acting as the HARQ terminating network node in this example only the eNB monitors and detects for a HARQ feedback sent 406 from UE. In this exemplary scenario it is assumed that the UE sent a NACK. Accordingly, the eNB will transmit 407 a retransmission in response to the received HARQ feedback. The UE receives the retransmission and combines 408 the retransmission data with the previously received data of the transport block, and again tries to decode 409 the combined data of the transport block. Exemplarily, it is assumed that the decoding of the transport block is successfully, so that the UE sends 410 an ACK to the eNB.

Assuming that there are two involved network nodes for example eNB and RN, there could be basically two scenarios for the distributed HARQ protocol operation with macro-diversity support. In the first scenario discussed with respect to FIG. 4 above, the eNB is terminating the HARQ protocol towards the UE. Consequently the RN would only send the first transmission of a transport block simultaneously with the eNB. HARQ feedback from the UE is only monitored/detected by the eNB, which also controls potential retransmissions of a transport block. In the second scenario the RN would be the network node which is terminating HARQ. Here eNB would only send first transmissions of a transport block. Since only RN is monitoring/detecting a HARQ feedback sent from the UE and controlling the retransmissions, from eNB point of view there is only a "one-shot" transmission for a transport block.

Figure 5:
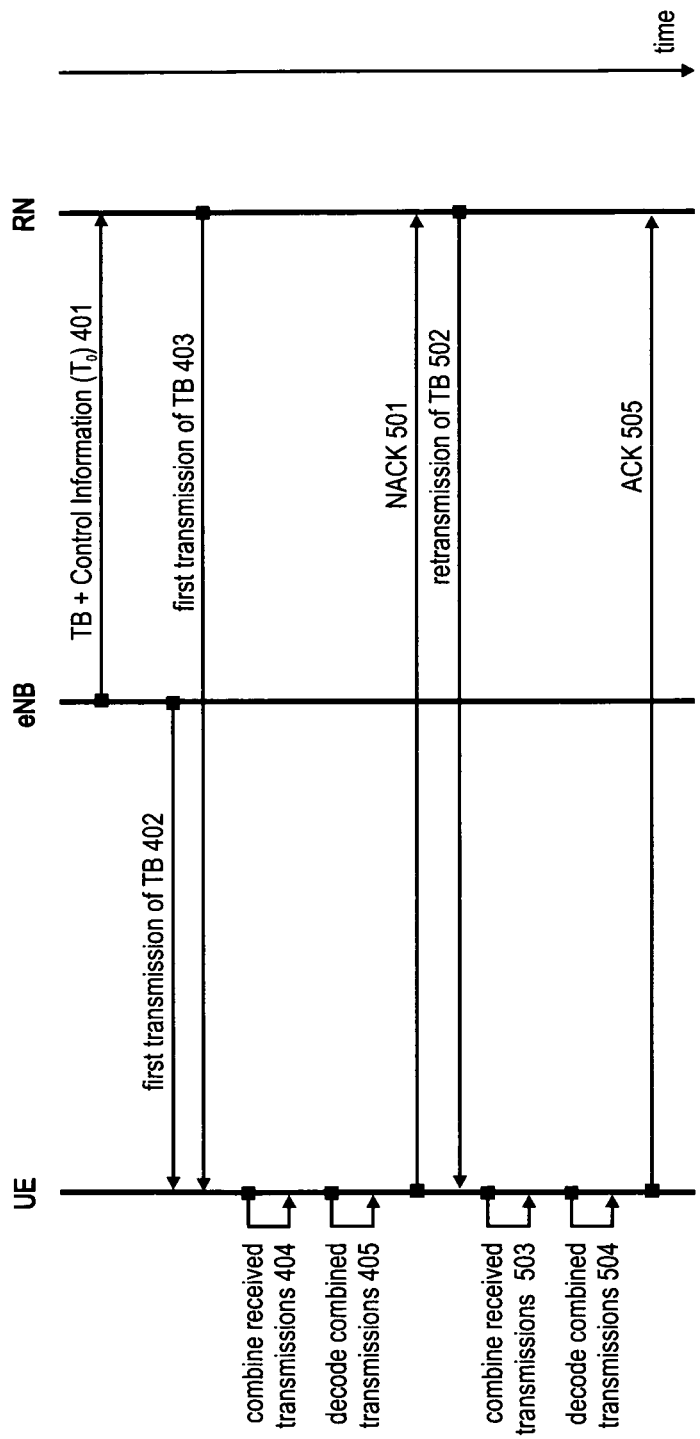

This second scenario is exemplarily shown in FIG. 5. Similar to FIG. 4, the eNB first eNB conveys 401 the transport block (TB) and some associated control information to the relay node via the air interface linking the nodes. Furthermore, the control information comprises an indicator that informs the RN that it is to terminate the HARQ protocol for the transmission of the transport block. The first transmission of the forwarded transport block on the downlink is sent 402, 403 from both eNB and relay node at the synchronized transmission timing and the UE combines 404 the received transmissions and tries to decode 405 the transport block.

As the RN is terminating the HARQ protocol the UE sends 501 the HARQ feedback (in this example a NACK) to the RN. The RN sends 502 a retransmission for the transport block in response to the HARQ feedback. The UE again combines 503 the retransmission data with the previously received transmissions of the transport block and decodes 504 the transport block. As decoding is assumed to be successful, the UE sends 505 an ACK to the RN.

Viewing it from a HARQ protocol point of view there are basically two HARQ protocol modes a network node might be in: In the first HARQ protocol mode which is referred to as "ON" mode herein, the network node performs a normal HARQ operation as defined for LTE. For the second HARQ protocol mode, which is referred to as "OFF" mode herein, the network node performs only a "one-shot" transmission per transport block, i.e. there are no further retransmissions for a transport block from a network node which is in a "OFF" HARQ protocol mode.

Similarly also the ACK/NACK detection behavior would be different for the two HARQ protocol modes. In the "ON" mode the network node needs to detect/monitor and process HARQ feedback as defined in the normal HARQ protocol. In the "OFF" mode there is no need for the network node to detect HARQ feedback since there will be no retransmission anyway.

Next, the content of the control information which is signaled over the interface between the network nodes (e.g. between an eNB and a relay node) is discussed in more detail. It should be noted that the content of the control information is depending on the system design of the communication system where the invention is employed.

As already indicated above, the control signaling sent via the interface lining the network nodes is used to coordinate the downlink data transmissions between eNB and RN and to synchronize the UE and the network entity which is terminating the HARQ protocol in terms of uplink resource used for the HARQ ACK/NACK signaling. The first transmission of a transport block is simultaneously transmitted from both network nodes. Accordingly, the control information is used to inform the other network node(s) on the transmission timing, for example by indicating the transmission time interval or sub-frame in which the first transmission of the transport block should be transmitted by the involved network nodes.

Further, if the HARQ protocol modes should be dynamically configurable/switchable for transmission of different transport blocks, the control information may also comprise a so-called HARQ termination flag. This flag indicates whether the network node which is receiving the control information should run the normal HARQ protocol operation which is defined for the downlink direction ("ON" mode) or whether the network node should only make a one-shot transmission and basically switch off the HARQ protocol for the corresponding transport block ("OFF" mode) for the transmission of the forwarded transport block. Its should be noted that in case the HARQ protocol mode, respective HARQ protocol terminating node is (semi-)statically (pre-)configured, the HARQ protocol mode may not need to be signaled or may be configured by other protocols, such as RRC signaling or the like.

Furthermore, if there is more than one HARQ process involved and to allow for a correct HARQ protocol operation within the UE in this case, the control information exchanged between the network nodes may further comprise HARQ related information to coordinate the HARQ operation. For example, the HARQ process ID and NDI or sequence number value could be included to the control information so as to allow all network nodes transmitting the first transmission of the transport block to use the appropriate HARQ process and to indicate the correct NDI/sequence number to the mobile terminal. Please note that—for example—in case the HARQ process ID is implicitly identified by the transmission timing of the transport block, same needs not to be signaled.

In case a first transmission is transmitted on the same physical downlink resource and with the same MCS from the involved network nodes, i.e. a SFN operation is to be implemented, then also information on the used resources and modulation and coding scheme should be exchanged over the Y3 interface. In this case, the UE would not be aware that a transport block was transmitted from multiple network nodes, as the channel would combine the transmissions due to being sent on the same radio resource.

Also in case no SFN transmission is intended, the control information may include an indication of the modulation and coding scheme (MCS) and (optionally further) an indication of the physical downlink channel resource to be used for the transmission. Based on the coding parameters of the MCS, the network node receiving the control signaling may generate the different redundancy versions from the transport block (i.e. the user plane data). Furthermore, to have full control on the redundancy version being sent, the control information may also include an indication of the redundancy version to be sent.

It should be further noted that the control information need to be only transmitted once per transport block, i.e. together with the transport block. It should be further noted that the eNB can basically control the diversity scenario operated for a transport block by setting the HARQ termination flag and the other control information accordingly. Essentially the eNB decides whether relay node should terminate the HARQ protocol for the transmission of the transport block, i.e. handle retransmissions, or whether the eNB itself should handle retransmissions for a given transport block.

Figure 6:
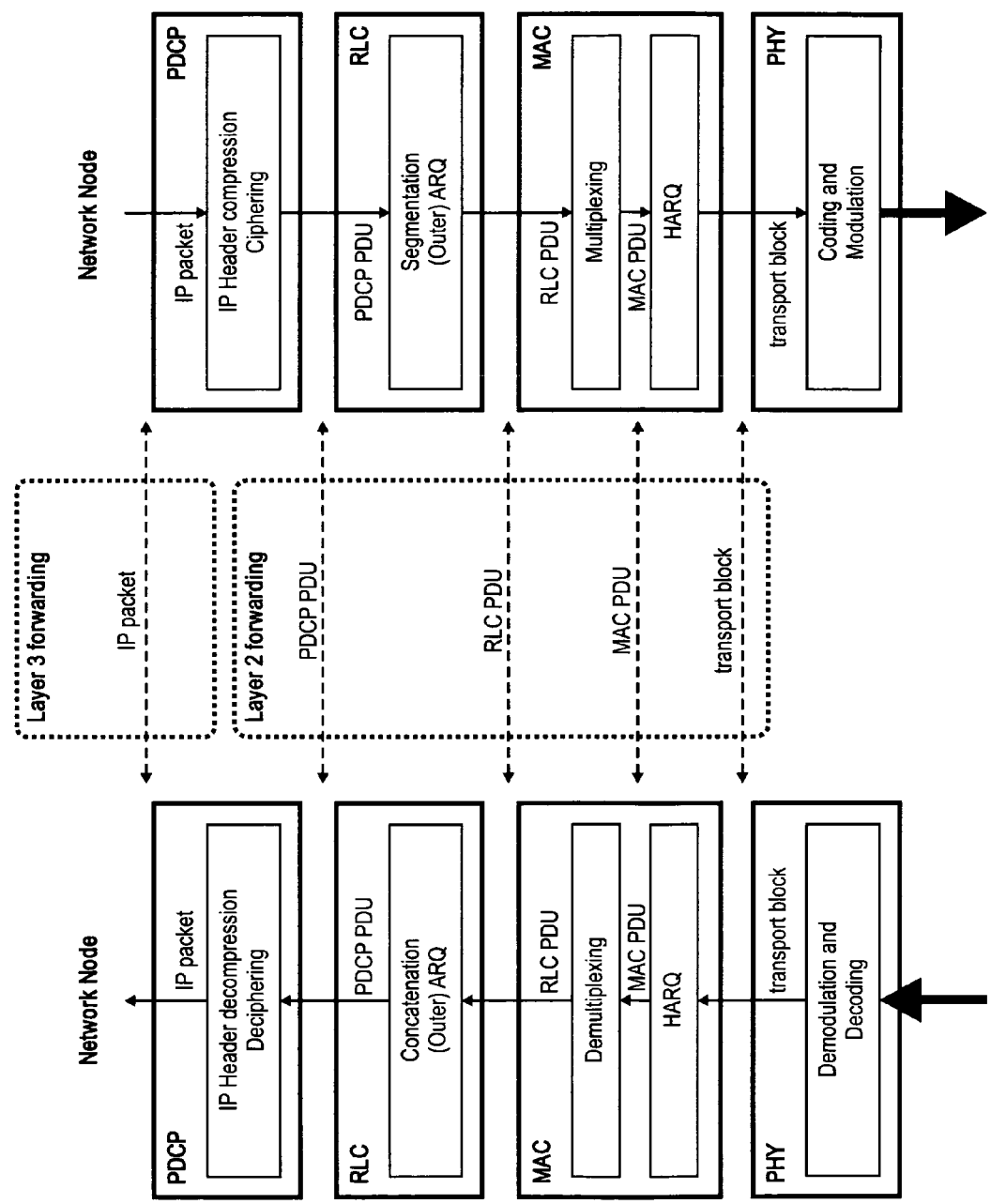
FIG. 6 shows the user plane entities in LTE and their respective functions.

Generally it should be noted that data forwarded between the network nodes (e.g. eNB and relay node) could be done on a higher protocol layer than forwarding transport blocks. Even though most embodiments of the invention described herein assume for exemplary purposed that transport blocks are transferred from eNB to relay node, the invention is not limited thereto. As shown in FIG. 6 there could be several other alternatives for the forwarding of user plane (U-Plane) data between the network nodes. FIG. 6 exemplarily shows the user plane entities in LTE and their respective functions. The network node on the right is considered the network node sending the user plane data to the other network node on the left. The two network nodes shown in FIG. 6 may be for example an eNB forwarding user plane data to be transmitted to a UE to a relay node (RN). As can be perceived from FIG. 6, there exist several possibilities in Layer 3 and Layer 2 for forwarding the user plane data from the eNB to the RN.

Generally it should be noted that a transport block and a MAC PDU are identical. Furthermore, the HARQ protocol may be, strictly speaking, not only part of the MAC layer but is typically distributed in MAC and PHY layer. E.g. the combining and generation of redundancy versions are typically implemented in the PHY layer, while the HARQ protocol operation is typically controlled by the MAC layer.

In order to ensure a coordinated macro-diversity transmission, where a downlink transmission is done from multiple network nodes simultaneously, it's necessary that all the involved network nodes have the same transport block for a macro-diversity transmission. Only in this case the UE can combine the received transmissions and benefit from the diversity gain. Therefore, in case IP packets are forwarded over the Y3 interface to the relay node rather than transport blocks, it must be ensured that the relay node segments the IP packets such that the generated transport blocks for downlink diversity transmission are identical to the transport blocks in the eNB. There are several methods how to achieve this. Essentially the control information which is associated with the forwarded U-Plane data contains further information which allows the relay node to correctly generate the transport blocks. For example, the desired transport block size could be conveyed to the relay node within the control information or alternatively, the modulation and coding scheme and the physical channel resource allocation can be signaled based on which the relay node could calculate the transport block size.

As already mentioned before, the first transmission of a transport block is sent from multiple network nodes. This means that the UE may receive multiple related physical downlink control channels in one transmission time interval for those transmissions. For example, when considering a LTE or LTE-A communication system, i.e. each involved network node might send a PDCCH together with the PDSCH (Physical Downlink Shared Channel), i.e. the transmission of the transport block. Alternatively one PDCCH could contain the control information for multiple downlink transmissions, so that only one PDCCH would need to be sent to the mobile terminal. Since the UE is only sending HARQ feedback in response to the transmissions from the network nodes which is only monitored by the network node terminating HARQ, another embodiment of the invention is suggesting some new rules regarding the HARQ feedback behavior of the UE.

Basically the UE needs to know on which uplink resource the HARQ feedback is to be sent. Similarly, also the HARQ terminating network node needs to know on which uplink resource the HARQ feedback is to be expected so that it can monitor the uplink resource for HARQ feedback. In order to synchronize the UE and the HARQ terminating network node with respect to the physical uplink resource used for the transmission of the HARQ feedback, it is proposed that RRC configures resources used for HARQ feedback. For example, considering an LTE or LTE-A system, this resource could be for example a resource on the PUCCH (Physical Uplink Control CHannel) or a resource on the PUSCH (Physical Uplink Shared CHannel), which is only used for control information, or any other uplink resources.

In one embodiment, the UE behavior may be implemented as follows. In case a UE receives more than one downlink PDCCH for transmissions of the same transport block (multi-diversity transmission) within a transmission time interval, the UE uses the physical channel resource on uplink configured by RRC for the transmission of the corresponding HARQ feedback. Please note that—considering the examples of FIG. 4, FIG. 5 and FIG. 7, the eNB and the RN are also aware of the RRC configured resource for the HARQ feedback so that both of them may monitor and process HARQ feedback sent by the UE on such resource. The RRC configured physical channel resource on the uplink for the HARQ feedback may therefore also referred to a common physical channel resource of the eNB and the RN. Whether the eNB or the RN is receiving and processing the HARQ feedback depends on the decision which of the two network nodes is terminating the HARQ protocol, as discussed above.

In case only one downlink PDCCH is received for a transmission of a transport block (for example retransmission of a transport block or SFN), the UE transmits the HARQ feedback on an physical channel resource that is linked to the physical channel resource on which the downlink PDCCH has been received or the physical channel resource used for the transmission of a transport block on the PDSCH. In a more specific example, the physical channel resource on uplink for the HARQ feedback is linked to CCE index of the received downlink PDCCH.

By employing this UE behavior, the UE and the HARQ terminating network node have the same understanding of the physical channel resource used for HARQ feedback transmission. It's assumed here that the HARQ feedback is sent at a fixed offset upon having received the PDSCH, i.e. synchronous HARQ feedback timing.

A further embodiment of the invention is related to considerations as to the parameters based on which a network node decides which network node participating in a multi-diversity transmission of a data packet is to terminate the HARQ protocol towards the UE. One parameter for deciding the network node to terminate the HARQ protocol may be for example measurements by the UE. The UE measurements could serve as a parameter to decide by the network node whether to utilize macro-diversity for the transmission of a transport block on the downlink at all, and if so, and to trigger a corresponding diversity mode. For example, an eNB may decide based on reported measurements whether to enable macro-diversity transmissions and decide which network node is to terminate the HARQ protocol, i.e. diversity mode. The measurements could be for example channel quality measurements, which determine the downlink channel quality. The downlink channel quality reported by the UE may be the downlink channel quality between the eNB and the UE only and/or the downlink channel quality between a relay node and the UE.

In one exemplary embodiment of the invention it is assumed that the UE can receive signals from both eNB and RN in a so called "soft handover area", e.g. an area of coverage where the area of coverage of the eNB and the RN are overlapping. In one exemplary scenario, the UE measures the channel quality of both links and reports both measurement results to the eNB. The report could for example indicate the channel quality values for both links, e.g. SNR or Cal values, or alternatively indicate some ranking of the links. Based on this reported measurements, the eNB decides on diversity mode. For example in case the measurement reports indicates that the channel quality of the RN-to-UE link is better by a certain margin than the quality of the eNB-to-UE link, the eNB could configure a diversity mode, where RN is controlling the retransmissions, i.e. the RN acts as the HARQ terminating network node.

In addition or alternatively to channel quality measurements, also other parameters could be considered by the eNB to decide the diversity mode. For example, the eNB could configure the diversity modes under consideration of it's load or capacity. In cases where the load in the eNB is already quite high (i.e. exceeding some threshold)—for example due to the eNB is serving a huge number of UEs—the eNB might decide that the RN should take care of retransmissions for certain downlink transmissions. This would be a kind of capacity de-loading and allow for easing the processing burden in eNB.

Although most of the exemplary embodiments described so far have assumed that the diversity mode, respectively, the HARQ terminating network node is dynamically selected, e.g. per transport block, it should be noted that it is also possible to configure the diversity mode on a semi-static basis. For this purpose, higher layer signaling could be for example used in order to setup the diversity configuration, i.e. determining the HARQ protocol mode for each involved network node. This configuration would be valid until the next reconfiguration. A semi-static configuration of the HARQ protocol mode/diversity mode may be beneficial, as it may reduce the signaling load on the interface between the network nodes, e.g. on the Y3 interface between eNB and RN, as no HARQ termination flag would need to be signaled per transport block.

Figure 7:
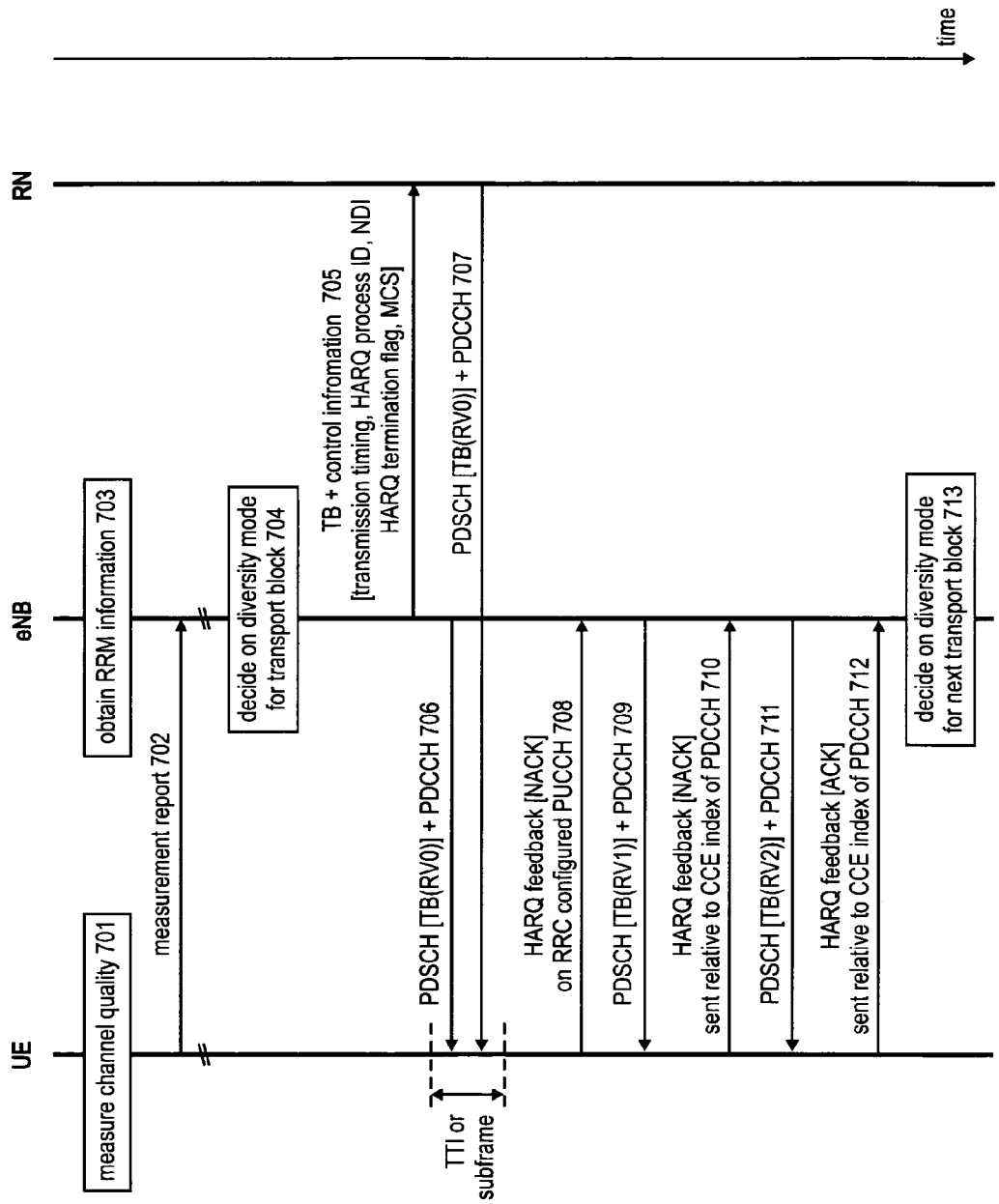
FIG. 7 shows a more detailed message flow and operation of a UE, an eNB and a RN when using a downlink data transmission scheme employing macro-diversity and HARQ according to a further exemplary embodiments of the invention.

FIG. 7 shows a more detailed message flow and operation of a UE, an eNB and a RN when using a downlink data transmission scheme employing macro-diversity and HARQ according to a further exemplary embodiments of the invention. This embodiment is specifically relating to an LTE-A system. The eNB may be exemplarily considered the controlling entity deciding on which entity is to terminate the HARQ operation. The UE could for example perform 701 measurements of the downlink channel quality between the eNB and the UE and/or the downlink channel quality between RN and UE. The results of the measurements are provided 702 to the eNB within a measurement report. The channel quality may be for example expressed by a measured SNR or by means of signaling a CQI. Alternatively, the UE could also indicate a priority of the measured downlink channels to the eNB. Other parameters that can be taken into account by the eNB to decide on the HARQ termination are for example resource management aspects. Accordingly, the eNB may for example obtain 703 resource management related information from the RRC layer.

Based on the obtained and/or received information, the eNB 704 decides which network node is to terminate the HARQ protocol for the transmission of the next transport block to be provided to the UE. Assuming that the downlink channel quality between eNB and UE is comparable or better than that between RN and UE, the eNB decides that it terminates HARQ. Accordingly, the eNB provides 705 the next transport block together with control information to the RN. In this example, it is assumed that the control information communicates the timing for the first transmission of the transport block, the HARQ process ID of the HARQ process used for the transmission of the transport block, the NDI value to be indicated to the UE in the PDCCH, a HARQ termination flag indicating to the RN that the eNB terminates HARQ, and MCS information for the first transmission (here an example is considered where the eNB also controls the transport format of the transmission by the RN, which is of course optional).

Next, the eNB and the RN each transmit 706, 707 a first transmission of the transport block to the UE using the given HARQ process. In this case both nodes transmit redundancy version RV0, i.e. identical channel coded bits, to the UE on different physical channel resources (PDSCHs) within a single transmission time interval (e.g. the same downlink sub-frame). In order to inform the UE on the parameters required to receive the transmissions by eNB and RN, the eNB and the RN each send a PDCCH including the required L1/L2 control information to the UE. Typically, the PDCCH includes information as outlined in the Technical Background section, however, the format and content of the PDCCH may also vary from the implementation discussed in the Technical Background section. Generally, the L1/L2 control information on the PDCCH provide the UE with physical layer parameters so that the UE can identify the physical channel resource on the downlink channel to detect the respective transmissions by eNB and RN on the PDSCH, modulation and coding scheme information for demodulation and decoding and HARQ related information, such as NDI and HARQ process ID.

It should be further noted that the eNB and the RN do not necessarily need to transmit the same data to the UE. For example, the RN could also send another redundancy version than RV0 to the UE in the first transmission. Basically, the RN can construct different redundancy versions for the given transport block and send it to the UE. In one further example, the eNB could also indicate the RV to be sent by the RN in the control information signaled 705 to the RN.

As the UE has received multiple (two) PDCCHs, the UE will use the RRC configured resource on the PUCCH to transmit 708 the HARQ feedback to the eNB—strictly speaking, at the time of sending the HARQ feedback, the UE is not yet aware of which network node is terminating the HARQ protocol, but knows that the HARQ terminating network node will monitor and process the HARQ feedback sent on the RRC configured physical channel resource in the uplink. In the example of FIG. 7, it may be assumed that (after combining the first transmissions of the transport block by the UE) the UE could not successfully decode the transport block so that it sends 708 a NACK on the RRC configured physical channel resource. As the eNB is terminating the HARQ protocol, the eNB is monitoring the RRC configured physical channel resource on the PUCCH for the HARQ feedback and receives same.

In response to the NACK received from the UE, the eNB sends 709 a first retransmission of the transport block (e.g. RV1) on the PDSCH to the UE on the given HARQ process. The retransmission is again accompanied by a PDCCH of the eNB with the required L1/IL2 control information. The UE combines the retransmission with the buffered data of the first transmissions by eNB and RN and tries to decode the obtained combined data of the transport block.

Again, it is assumed for exemplary purposes that the decoding of the transport block fails, so that the UE sends 710 another NACK. This time, the UE has only received one PDCCH for a transmission of the transport block on the given HARQ process received in the transmission time interval—at this point in time the UE can also conclude that the eNB is terminating HARQ, as the UE received the retransmission from the eNB. Accordingly, the UE sends 710 the HARQ feedback on a physical channel resource of the PUCCH with a given offset to the CCE used for transmitting the PDCCH in step 709. In other words, the HARQ feedback for a transmission is send on the physical channel resource on the PUCCH having an CCE index linked to the CCE index for sending the PDCCH for said transmission.

The eNB acting as the HARQ terminating node again monitors and receives the appropriate physical channel resource on the PUCCH and sends 711 a further retransmission of the transport block on the PDSCH to the UE together with the accompanying PDCCH. This time the UE successfully decodes the transport block and sends 712 an ACK. As there is only one PDCCH for a transmission of the transport block on the given HARQ process received in the transmission time interval, the UE again uses a physical uplink resource on the PUCCH that is linked to the CCE index for transmitting the PDCCH in step 711 for sending the HARQ feedback.

As the transmission of the transport block has been acknowledged by the UE, the eNB may now proceed with transmitting the next transport block on the given HARQ channel and may thus decide 713 again, which node is to terminate the HARQ protocol for the transmission of the next transport block.

In the embodiments discussed in the Detailed Description above, only first transmissions of a transport block are transmitted from multiple network nodes, e.g. macro-diversity gain is only achieved for initial transmission. According to a second aspect of the invention, a distributed HARQ protocol is provided where any transmission including retransmissions can be transmitted from multiple network nodes in order to benefit from an increased macro-diversity gain. Whether a transmission respectively retransmission of a transport block is done from multiple nodes may be for example dynamically decided by the network entity which is terminating the HARQ protocol. Since only the HARQ terminating network node is handling the HARQ transmissions, buffer and the corresponding HARQ state variables, e.g. only this node is really applying a HARQ protocol operation, it is the entity which decides whether a retransmission is also transmitted from the other involved network nodes.

Figure 8:
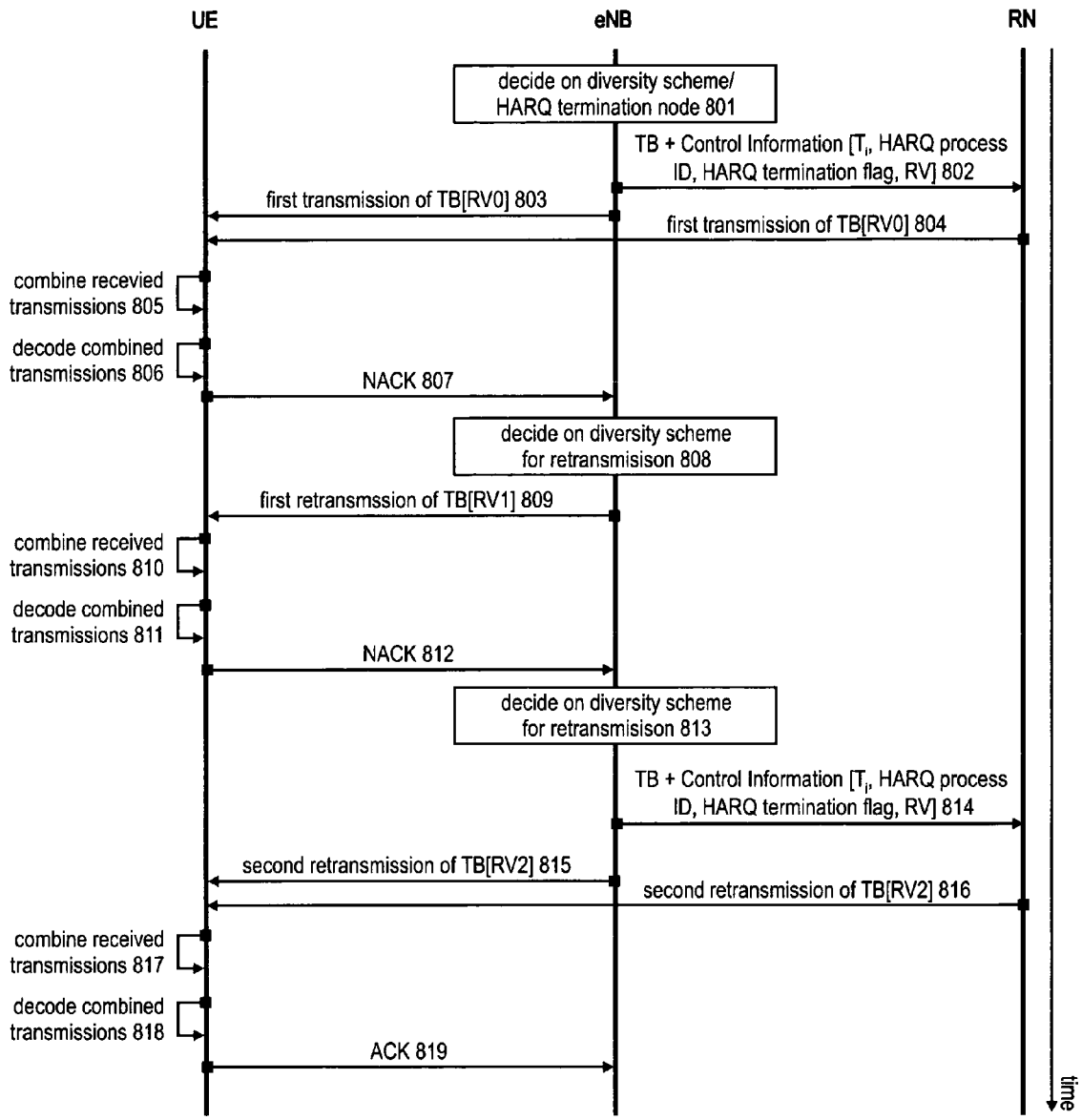
FIG. 8 shows a message flow and operation of a UE, an eNB and a RN when using a downlink data transmission scheme employing macro-diversity and HARQ according to a another exemplary embodiments of the invention.

FIG. 8 is showing the message flow and operation of a UE, an eNB and a RN according to an exemplary embodiment of the invention being in line with the second aspect of the invention. It is exemplarily assumed that the serving network node (e.g. a serving eNB) is deciding 801 that it is acting as the HARQ terminating network node for a certain transport block. Furthermore, the eNB has decided that the initial transmission of the transport block is transmitted from the eNB as well as a RN like in the embodiments of the invention discussed above, where the macro-diversity gain is only used for the first transmission of a transport block. Accordingly, the eNB provides 802 the transport block and together with the appropriate control information to synchronize the transmission timing and the HARQ termination flag to the RN. In the example shown in FIG. 8, the control information indicates the transmission timing ($T_i$), the HARQ process to use (HARQ process ID), the HARQ terminating network node (HARQ termination flag), and the redundancy version to be sent by the RN (RV). As noted above, the content of the control information is implementation dependent.

The eNB and the RN both transmit 803, 804 a first transmission of the transport block (e.g. redundancy version RV0) to the UE according to the synchronized transmission timing.

The UE may be assumed to combine 805 the transmissions received from the eNB and the RN and to fail decoding 806 the combined downlink transmissions provided from the eNB and the RN. Accordingly, the UE sends 807 a NACK to the HARQ terminating network node, i.e. the serving eNB, in response thereto.

Upon detection of the NACK, the eNB decides 808 that the first retransmission of the transport block is only being transmitted from eNB, i.e. no diversity transmission is to be used for the first retransmission. Consequently no control information needs to be transferred to the RN. The eNB sends 809 the retransmission of the transport block to the UE, e.g. this time transmitting redundancy version RV1 of the transport block.

Again the UE combines 810 the received transmissions (i.e. the first transmissions and the retransmission) but fails to decode 811 the transport block. Accordingly, the UE again sends 812 a NACK in the uplink to the HARQ terminating node. For the second retransmission of the transport block eNB decides 813 that it should be sent using macro-diversity, i.e. that the second retransmission is to be sent from eNB and RN. Therefore, the eNB signals 814 the transport block with the associated control information to the RN, similar to step 802. At the synchronized timing which is provided to RN within the control information in step 814, both RN and eNB send 815, 816 the second retransmissions to the UE (e.g. this time both network nodes send redundancy version RV2).

The UE again combines 817 the received second retransmissions from eNB and RN with the previously received transmissions and—this time—successfully decodes 818 the transport block. Accordingly, the successful decoding of the transport block is confirmed 819 by an ACK sent to the HARQ terminating network node, i.e. the eNB in this example.

As can be seen the increase of macro-diversity gain is achieved at the expense of a higher signaling overhead on the interface between eNB and RN. For every transmission, which is done from multiples network nodes, control signaling over this interface needs to be signaled.

It should be also noted that in all embodiments according to the second aspect of the invention, the individual transmissions of the transport blocks on the downlink may be accompanied by respective physical downlink control channels that allow the UE to properly receive the transmissions. Moreover, also the above outlined rules for the UE behavior with respect to the transmission of the HARQ feedback may be used in the embodiment described with respect to FIG. 8. Similar to the rules above, the UE may use a RRC configured physical channel resource in the uplink for the HARQ feedback, if it receives two or more physical downlink control channels and the UE uses a physical channel resource in the uplink linked to the index of the physical downlink control channel resource, if only one physical downlink control channel is received.

According to a further third aspect of the invention, another downlink data transmission scheme using HARQ is discussed in the following. Instead of using macro-diversity, the downlink transmission schemes described above may be varied, so that site-diversity instead of macro-diversity is employed. The controlling network node, e.g. the serving eNB may decide for each transmission of a transport block, which network node is to transmit the transmission towards the UE.

Figure 9:
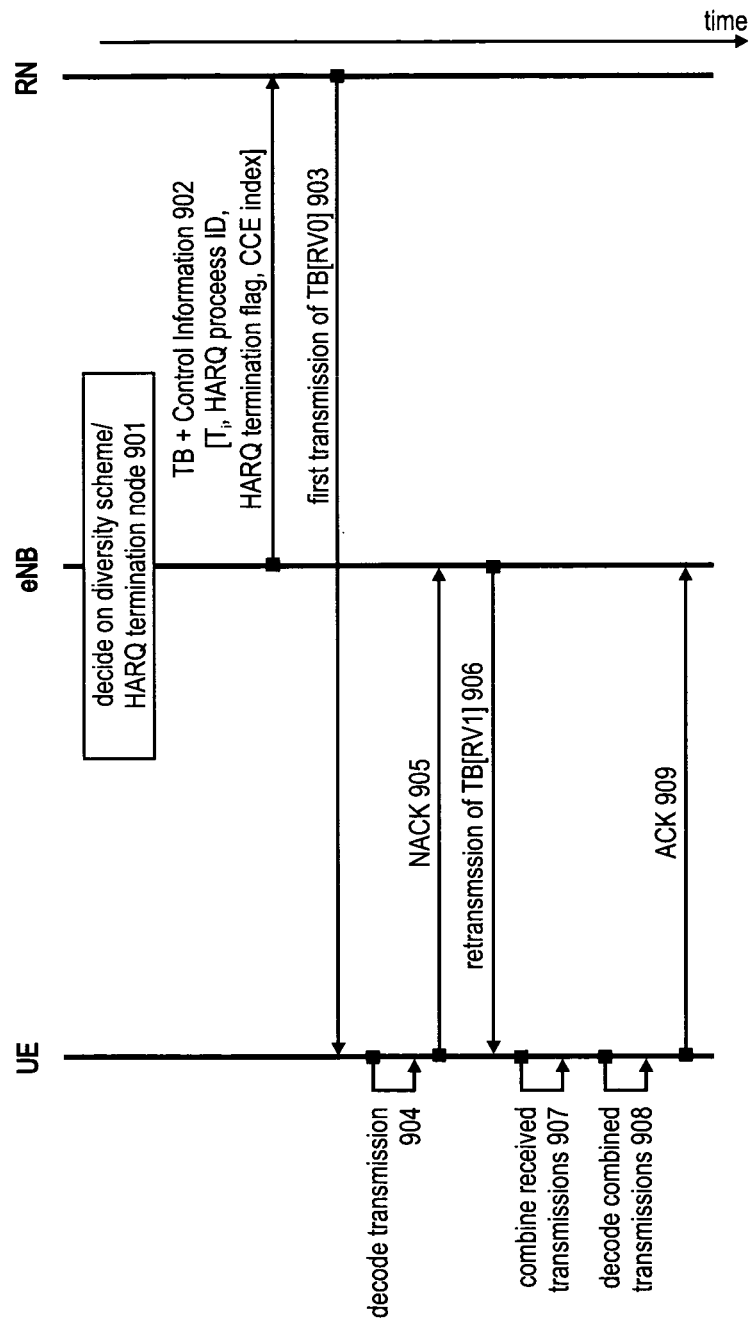
FIG. 9 shows a message flow and operation of a UE, an eNB and a RN when using a downlink data transmission scheme employing site-diversity and HARQ according to a another exemplary embodiments of the invention.

An exemplary data transmission scheme in accordance with the third aspect of the invention will be outlined with respect to FIG. 9 in the following. FIG. 9 shows the message flow and operation of a UE, an eNB and a RN according to an exemplary embodiment of the invention being in line with the third aspect of the invention. In this exemplary embodiment, the eNB, which is acting as the HARQ terminating network node, decides 901 to skip the initial transmission of a transport block, i.e. decides that the initial transmission is sent from the RN only, and that retransmissions of the transport block are transmitted by the eNB.

In this case there would be no downlink transmissions from multiple network nodes. Consequently the UE can only benefit from the site-diversity gain since initial transmission and retransmission are transmitted from geographically separated locations.

According to its decision, the eNB forwards 902 the transport block and the associated control information, e.g. including the transmission timing and/or HARQ process ID and the HARQ termination flag (to indicate to the RN that the eNB terminates the HARQ protocol). The RN transmits 903 the first transmission of the transport block at the given timing and using the given HARQ process.

The UE tries to decode 904 the transmission of the transport block and, as the decoding is assumed to be unsuccessful, the UE sends 905 a NACK to the HARQ terminating node. The HARQ terminating node, i.e. the eNB in this example, sends 906 a retransmission of the transport block to the UE in response to the received HARQ feedback. The UE combines 907 the retransmission of the eNB and the initial transmission from the RN and decodes 908 the transport block successfully. Accordingly, the successful decoding is signaled 909 by means of an ACK to the eNB.

In case the UE should use the rules for choosing the appropriate physical uplink channel resource for sending the HARQ feedback, some modification of these rules is required in this example, as there will be only a single physical downlink control channel (PDCCH) being sent for this first transmissions by the RN, i.e. the network entity not terminating HARQ. However, the HARQ feedback (ACK/NACK) should be detected/processed by the node terminating HARQ protocol, i.e. the eNB, so that synchronization with respect to the HARQ feedback resource used by the UE in the uplink is required among RN and eNB.

As exemplified in FIG. 9, step 902 the HARQ terminating node, i.e. the eNB in the example discussed with respect to FIG. 9, informs the network node sending the first transmission (step 903) of the transport block on the CCE index to identify the physical channel resource on which the physical downlink control channel associated to the first transmission of the transport block should be sent. As shown in FIG. 9, the CCE index may be signaled as part of the control information.

The network node sending the first transmission uses the physical channel resource index indicated by the CCE index for the physical downlink control channel associated to the first transmission of the transport block. Accordingly, the UE will send the HARQ feedback with the correct timing and on the correct physical uplink resource to the network node terminating HARQ, so that UE and the network entity terminating HARQ are sending/detecting the HARQ feedback on the same resource. As already mentioned before, in case of a single received physical downlink control channel (PDCCH) being received by the UE within a TTI, the UE will send the HARQ feedback (ACK/NACK) on a physical uplink resource which is linked to the CCE index of the received physical downlink control channel (PDCCH).

Furthermore, the third aspect of the invention may be readily combined with macro-diversity schemes according to the first and second aspect of the invention. For example, the first and second transmission of the transport block may be sent from different network nodes (site-diversity), while the third transmission for the transport block may be sent from plural network nodes within the same TTI/sub-frame (macro-diversity). Essentially, it is also possible that the serving eNB is terminating the HARQ protocol and decides on a per-transmission basis, whether to send the next transmission of the transport block, from one or plural network nodes, e.g. from the eNB only, the RN only, or from both eNB and RN simultaneously (i.e. within the same TTI/sub-frame).

In the examples discussed with respect to FIGS. 4, 5 and 8, the UE has performed a combination of the first transmissions that have been received from the eNB and the RN prior to the first decoding attempt. It should be noted that in case the first transmission of the transport block is sent by eNB and RN implementing a SFN, the downlink channel will combine the first transmissions, so that the combining step for the first transmission is not necessary. Generally, every time a SFN transmission of the transport block is received from multiple nodes, these newly received transmissions may not be combined by the UE—nevertheless, a combination of the SFN transmission of the transport block with (a) previous transmission(s) of the transport block may still be necessary to benefit from the soft-combining gain.

Next, a further improvement to the UE behavior with respect to the selection of the appropriate physical uplink channel resource for signaling the HARQ feedback by the UE according to an embodiment of the invention will be discussed. Please note that this improvement may be used for all embodiments in accordance with the first, second and third aspect of the invention discussed herein. In the rules for the UE behavior discussed previously herein, it has been proposed that the UE uses the uplink resource as configured by RRC, if two or more physical downlink control channels (PDCCHs) are received for the same transport block in one TTI.

One problem with this UE behavior is that a missed PDCCH (the probability for a missed PDCCH is $10^{-2}$) leads to a de-synchronization with respect to uplink resources for HARQ feedback signaling between UE and the HARQ terminating network node. In a situation where eNB as well as RN send both a downlink transmission to the UE, the HARQ terminating network node assumes, that the UE uses the RRC configured resource for the HARQ feedback signaling. However in case one of the physical downlink control channels is missed by the UE, the UE will use the uplink resource according to the CCE index of the received single physical downlink control channel. Essentially the HARQ terminating network node will detect the HARQ feedback on a wrong physical channel resource, which will lead to the loss of the feedback signaling.

In order to avoid such a de-synchronization, the following behavior could be used. The RRC configures an uplink resource for HARQ feedback signaling as proposed previously. For received initial transmissions of a transport block the UE uses always this RRC configured resource for the HARQ feedback signaling regardless of the number of received physical downlink control channels. For any retransmission of the transport block, the UE uses a physical uplink resource linked to the CCE index of the received physical downlink control channel. In a further embodiment of the invention the UE always uses the RRC configured resources for HARQ feedback signaling regardless of the transmission being an initial transmission or retransmission.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently and its enhancements (LTE-A) discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for transmitting downlink data in a mobile communication system comprising a mobile terminal and at least two network nodes, the network nodes being capable of communicating with the mobile terminal via a wireless interface, the method comprising:
   transmitting a data packet and control information for a downlink transmission of the data packet from a first network node to a second network node, wherein the control information indicates whether the first network node or the second network node terminates a Hybrid Automatic Repeat reQuest (HARQ) protocol used for transmitting the data packet to the mobile terminal,
   transmitting by the first network node and the second network node a respective transmission of a data packet to the mobile terminal within one transmission time interval and using one of plural HARQ processes of the HARQ protocol,
   receiving from the mobile terminal HARQ feedback on the successful or unsuccessful decoding of the data packet only at the network node terminating the HARQ protocol, and
   transmitting all retransmissions of the data packet only from the network node terminating the HARQ protocol to the mobile terminal, thereby eliminating the need of HARQ protocol synchronization when using HARQ in the downlink with multiple data transmitting network nodes.

2. The method according to claim 1, further comprising transmitting by the first network node and/or the second network node a respective physical downlink control channel to the mobile terminal, wherein a respective physical downlink control channel's information indicates a physical channel resource and a HARQ process on which the transmission of the data packet is transmitted to the mobile terminal.

3. The method according to claim 2, wherein transmitting, by the first network node and/or the second network node, a respective physical downlink control channel to the mobile terminal, comprises the first network node and the second network node each transmitting a physical downlink control channel indicating the physical channel resource and the HARQ process on which the respective transmission of the data packet is transmitted to the mobile terminal, and the method further comprises receiving said HARQ feedback from the mobile terminal via a physical uplink channel resource configured by Radio Resource Control (RRC) signaling.

4. The method according to claim 2, wherein transmitting, by the first network node and/or the second network node, a respective physical downlink control channel to the mobile terminal, comprises the first network node or the second network node each transmitting a physical downlink control channel indicating the physical channel resource and the HARQ process on which the respective transmission of the data packet is transmitted to the mobile terminal, and the method further comprises receiving said HARQ feedback from the mobile terminal via a physical uplink channel resource linked to the physical downlink control channel resource index on which the physical downlink control channel is received by the mobile terminal.

5. The method according to claim 1, wherein the control information transmitted from the first network node to the second network node comprises a flag indicating whether the first or the second network node terminates a HARQ protocol.

6. The method according to claim 5, wherein the control information transmitted from the first network node to the second network node further indicates a HARQ process to be used for transmitting the data packet to mobile terminal and the value of the new data indicator for the data packet.

7. The method according to claim 6, wherein the control information transmitted from the first network node to the second network node further indicates transport format information of the transmission of the data packet from the second network node to the mobile terminal.

8. The method according to claim 1, wherein transmitting the transmission of the data packet by the first network node and the second network node, comprises the first network node and the second network node simultaneously transmitting the transmission of the data packet within a same transmission time interval.

9. The method according to claim 8, wherein the control information transmitted from the first network node to the second network node further indicates transmission time interval in which the transmission of the data packet is to be sent by the second network node.

10. The method according to claim 8 or 9, wherein the control information transmitted from the first network node to the second network node further indicates a physical shared downlink channel resource and transport format information for transmitting the transmission of the data packet to the mobile terminal and wherein transmitting the transmission of the data packet by the first network node and the second network node, comprises the first network node to the second network node simultaneously transmit the transmission of the data packet on a same physical channel resource and using a same transport format.

11. The method according to claim 1, further comprising deciding, by the first network node for each data packet to be transmitted to the mobile terminal, whether the first network node or the second network node is to terminate the HARQ protocol for the transmission of the data packet.

12. The method according to claim 11, wherein deciding whether the first network node or the second network node is to terminate the HARQ protocol for the transmission of the data packet comprises the first network node deciding whether the first network node or the second network node is to terminate the HARQ protocol for the transmission of the data packet based on the downlink channel quality reported by the mobile terminal and/or based on radio resource management criteria.

13. A mobile communication system for transmitting downlink data, the mobile communication system comprising a mobile terminal, a first network node and a second network node, the first network node and the second network node being capable of communicating with the mobile terminal via a wireless interface, wherein the first network node is adapted to transmit a data packet and control information on whether the first network node or the second network node terminates the Hybrid Automatic Repeat reQuest (HARQ) protocol for a downlink transmission of the data packet to the second network node, wherein the first network node and the second network node are adapted to transmit a respective transmission of a data packet to the mobile terminal within one transmission time interval and using one of plural HARQ processes of the HARQ protocol, and wherein only the HARQ terminating entity receives HARQ feedback on the successful or unsuccessful decoding of the data packet from the mobile terminal and transmits all retransmissions of the data packet from the network node terminating the HARQ protocol to the mobile terminal, thereby eliminating the need of HARQ protocol synchronization when using HARQ in the downlink with multiple data transmitting network nodes.

14. A mobile terminal for receiving downlink data in a mobile communication system, the mobile terminal comprising:

a receiver adapted to receive from a first network node and a second network node a respective downlink transmission of a data packet within a single transmission time interval, a processing unit adapted to combine the transmissions of the data packet received from the first network node and the second network node, a decoder adapted to decode the combined transmissions of the data packet, and a transmitter adapted to transmit Hybrid Automatic Repeat reQuest (HARQ) feedback only to a HARQ terminating entity being either the first network node or the second network node, wherein the HARQ feedback indicates whether the data packet has been successfully decoded, wherein the mobile terminal is adapted to receive all retransmissions for the data packet only from the HARQ terminating entity, thereby eliminating the need of HARQ protocol synchronization when using HARQ in the downlink with multiple data transmitting network nodes.

15. The mobile terminal according to claim 14, wherein the receiver is adapted to receive Radio Resource Control (RRC) signaling indicating a physical channel resource to be used for sending HARQ feedback related to the transmissions of the data packet to the network node terminating the HARQ protocol, and wherein the transmitter is adapted to transmit the HARQ feedback for the transmission of the data packet to the network node terminating the HARQ protocol using the physical channel resource configured by the RRC signaling, if a respective physical downlink control channel for the transmissions of the data packet is received from the first network node and the second network node.

16. The mobile terminal according to claim 14 or 15, wherein the transmitter is adapted to transmit HARQ feedback related to transmissions of the data packets on a physical uplink channel resource linked to the physical downlink channel resource index of a physical downlink control channel, if only one physical downlink control channel is received for a transmission of the data packet.

17. The mobile terminal according to claim 14 or 15, further comprising a measuring unit adapted to measure the downlink channel quality from the first network node to the mobile terminal, wherein the transmitter is adapted to transmit to the first network node the measured channel quality of the downlink channel used to transmit the downlink data from the first network node to the mobile terminal.

18. The mobile terminal according to claim 17, wherein the measuring unit is adapted to further measure the downlink channel quality from the second network node to the mobile terminal, and wherein the transmitter is adapted to transmit to the first network node the measured channel quality of the downlink channel used to transmit the downlink data from the second network node to the mobile terminal.

19. A network node for use in a mobile communication system, wherein the network nodes is capable of communicating with the mobile terminal via a wireless interface, the network node comprising:

a transmitter adapted to transmit a data packet and control information for a downlink transmission of the data packet to another network node, wherein the control information indicates whether the network node or the other network node terminates a Hybrid Automatic Repeat reQuest (HARQ) protocol used for transmitting the data packet to the mobile terminal and a transmission time interval in which the network node and the other network node are to transmit a transmission of the data packet to the mobile terminal, wherein the transmitter is adapted to for transmitting a respective transmission of a data packet to the mobile terminal within said transmission interval and using one of plural HARQ processes of the HARQ protocol, and a receiver adapted to receive from the mobile terminal HARQ feedback on the successful or unsuccessful decoding of the data packet, if the network node is terminating the HARQ protocol and wherein the transmitter is adapted to transmit all retransmissions of the data packet only to the mobile terminal, if the network node is terminating the HARQ protocol, thereby eliminating the need of HARQ protocol synchronization when using HARQ in the downlink with multiple data transmitting network nodes.

20. The network node according to claim 19, further comprising a processing unit for deciding whether the network node or the other network node is to terminate the HARQ protocol for the transmission of the data packet, wherein the processing unit is adapted to perform the decision for each data packet to be transmitted to the mobile terminal.

* * * * *